United States Patent
Matthews et al.

(10) Patent No.: US 7,240,296 B1
(45) Date of Patent: Jul. 3, 2007

(54) UNIFIED NAVIGATION SHELL USER INTERFACE

(75) Inventors: Joseph H. Matthews, Woodinville, WA (US); Stephen P. Capps, Seattle, WA (US); Richard W. Stoakley, Seattle, WA (US); Joe D. Belfiore, Seattle, WA (US); Walter W. Smith, Normandy Park, WA (US); Bradley M. Schick, Seattle, WA (US); Samuel J. McKelvie, Seattle, WA (US); Robert V. Welland, Seattle, WA (US); John P. Cordell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/502,970

(22) Filed: Feb. 11, 2000

(51) Int. Cl.
*G06F 17/00* (2006.01)

(52) U.S. Cl. ................ 715/840; 715/700; 715/802; 715/835; 715/838; 715/837; 715/841

(58) Field of Classification Search ................ 715/700, 715/802, 835, 838, 836, 837, 840, 841, 811, 715/745, 854, 739, 738
See application file for complete search history.

(56) References Cited

U.S. PATENT DOCUMENTS

| 5,050,105 | A | * | 9/1991 | Peters ........................ 715/854 |
| 6,055,327 | A | * | 4/2000 | Aragon ....................... 382/138 |
| 6,110,223 | A | * | 8/2000 | Southgate et al. ............ 716/18 |
| 6,167,455 | A | * | 12/2000 | Friedman et al. ........... 719/320 |
| 2001/0028368 | A1 | * | 10/2001 | Swartz et al. ............... 345/835 |

* cited by examiner

*Primary Examiner*—Kristine Kincaid
*Assistant Examiner*—Peng Ke

(57) ABSTRACT

A user interface for navigating among screens on a personal computer. The screens, which include layers of a shell user interface and various locations within applications, are presented as pages. In addition, commands and help information of an application are presented as a web of command pages. To this end, a unit of measure, called a "place" is defined. In general, an application is a place, and separate documents within an application may also define a place. Separate command windows and dialog boxes within an application or a document typically do not define a place. Backwards navigation takes the user to the previous place, and forward navigation (if possible) takes the user to the next place. Because the underlying data for a page may change between an initial visit to a page and navigation back to the page, data objects and page code are maintained separately, and are combined only when a request for a page is made.

45 Claims, 16 Drawing Sheets

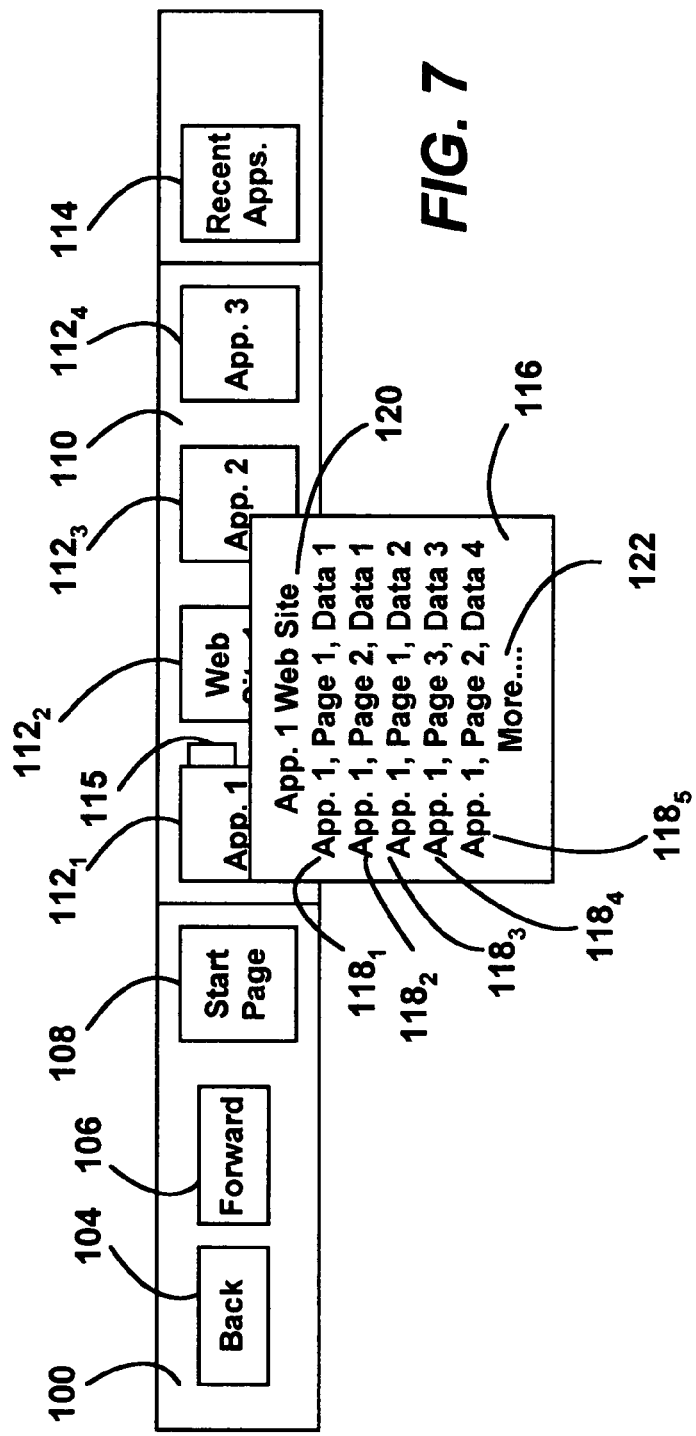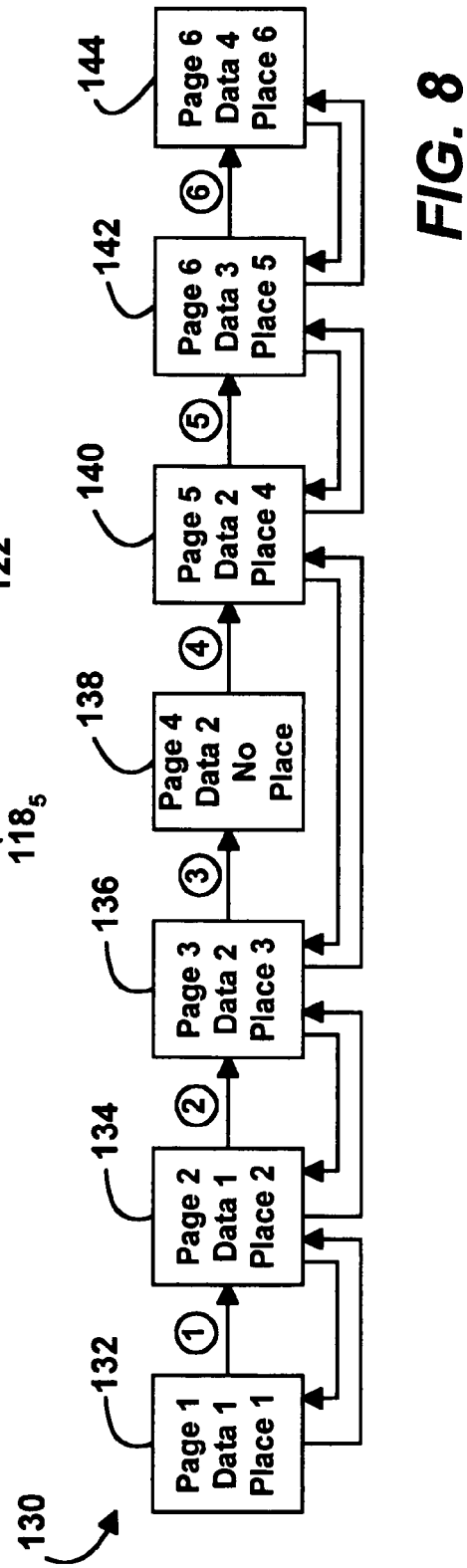

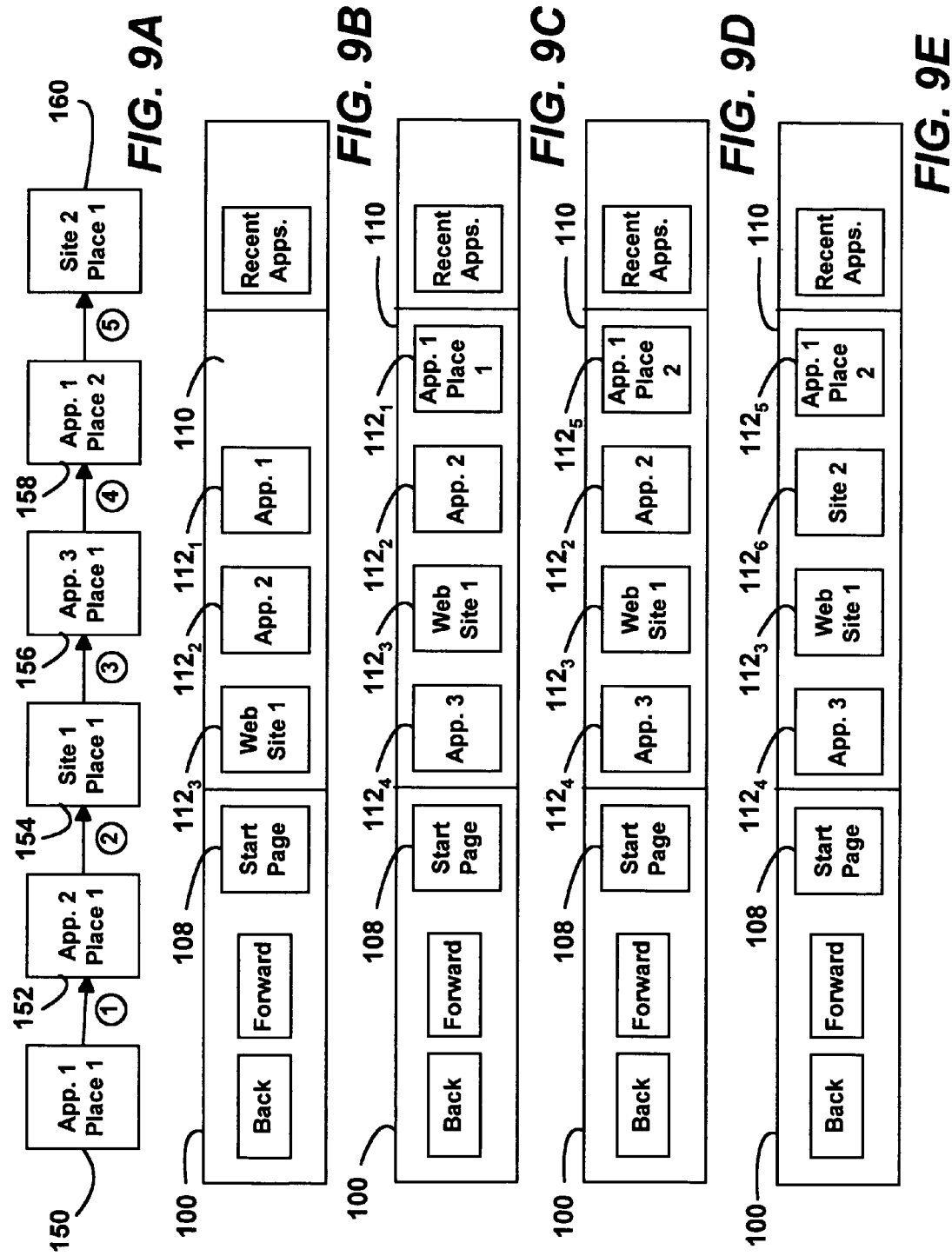

UNIFIED NAVIGATION SHELL USER INTERFACE

FIELD OF THE INVENTION

The present invention generally relates to computer systems, and more particularly to a graphical user interface for a computer operating system.

BACKGROUND OF THE INVENTION

A contemporary operating system, such as Microsoft Corporation's Windows® 98 operating system, provides many different ways to navigate between and within applications on a computer. For example, existing user interfaces utilize double clicks, right clicks, menu pulls, OK buttons, close boxes, and the like to open and close applications, or dialog boxes within applications. If more than one application is opened, a user may be presented with multiple windows, which may become complex and is often difficult to understand for many users, particularly a novice user.

Another problem that users encounter is that it is often difficult to find documents that the user had previously accessed, or find the same point (e.g., menu or dialog) within an application that the user had previously reached. A closed document and/or application suddenly disappears from the screen, requiring that a user know its location or some other way to return to the application and/or document at a later time. The problem is exacerbated by the fact that so many documents and/or applications are launched from different locations. For example, links to applications and documents may be presented on the user's desktop. Also, the Start button provides navigation via a pop-up menu to applications and recent documents, and a task bar provides an icon for each currently running application. The various options for accessing recent documents and applications may not be logical for a user, which may make finding a particular recent document or application difficult and confusing.

Users also often have difficulty understanding how to navigate to commands within an application. For example, existing applications utilize icons on tool bars, menu pulls, dialog boxes, and the like to provide access to commands that are available for the application. A user often finds the large number of icons and pull-down menu options to be overwhelming. Many times, the symbols used on the icons are often not that suggestive of the function of the command. Moreover, for drop-down menus and dialog boxes, the commands are typically presented as one or more words that are often not sufficiently descriptive of the function provided by the command. To discover the function (or find the appropriate command button), a user may need to consult help information. The help information is provided in a separate dialog box and/or window, and finding the appropriate help topic about the command in question may be difficult. Navigating through all of these options may be complex, and a user may not be able to access, or may not even be aware of, a variety of commands available in an application.

SUMMARY OF THE INVENTION

The present invention relates generally to a user interface for navigating among screens on a personal computer. The user interface provides back and forward buttons for navigating across a large range of scenarios and interactions offered on the computer.

Existing web browsers, such as Microsoft Corporation's Internet Explorer, provide back and forward buttons for stepping back and forward among screens accessed by a user. However, these controls are only available within the context of the web browser application. With the release of Microsoft Corporation's Windows 98, these controls were extended to a limited set of scenarios and places within the operating system (e.g., Windows Explorer). However, navigation between applications (and often within the applications) still required movement between, and opening and closing of, multiple windows and/or dialog boxes. In contrast, the back and forward navigation of the present invention provides movement between pages or locations in different applications. To this end, a unit of measure, called a "place" is defined. In general, an application is a place, and separate documents within an application may also define a place. Separate command windows and dialog boxes within an application or a document typically do not define a place. Backwards navigation takes the user to the previous place, and forward navigation (if possible) takes the user to the next place.

To facilitate forward and backward navigation, a global travel log maintains a queue of visited places. Animations may be provided so that a user is aware that a navigation between places is occurring, which may not be readily apparent to a user when navigating between places in the same application. The animations may also provide an indication of the navigation direction, e.g., backward.

In addition to the global travel log, a separate travel log is maintained for each of the applications that have been run on the computer. What is entered into the travel log for each application may be specified by the application. The travel log may be utilized to navigate among the places visited within the application, for example through a drop-down menu or a separate page.

When a user navigates away from a page, the page code (i.e., the code/static data that implements a page) is maintained separately from the data (the document or objects which the page code is bound to, editing, or viewing). This is because the underlying data for a place may be applied to many page codes, and the data should maintain its identity across all pages.

Data objects and page code are maintained separately, and are combined only when a request for a place is made. To this end, when a navigation away from a page is made, information about the place is saved in the form of a Persistent Application Page, which includes a pointer to the page code, and the place's View State, which includes information about the view that is to be shown ("view information") and a persistent reference to the data, in the form of a moniker. The Persistent Application Page, or information about the Persistent Application Page, is written into the travel log or logs for each place.

To retrieve a place as a result of a request via the shell user interface (e.g., by backward navigation via selecting the "Back" button), the Persistent Application Page is called, and, in return, the moniker retrieves the associated data object and view information and binds it to the page code. The view information may be provided as a part of the moniker, metadata associated with the data object, or via a registry of data objects and page views. The data object is bound to the page code to produce an instance of the page in accordance with the view information, and the screen display is updated to return the user to the selected place.

Another aspect of the present invention is directed to converting commands and help information of an application (presently presented in dialog boxes, pop-up menus, and the like) into a web of pages. To this end, each application has command information defined therewith according to a defined command schema. In the schema, commands are grouped into command groups. Each command group and command may include the following fields: a short name (terse), a long name (verbose), verbose descriptive information, a small icon, a large icon, a list of application contexts for which the command is valid, and an alias name, which may help find the command in a search. Command groups also have a list of commands and/or other command groups that belong to the command group.

The command schema enables a web of pages to be constructed from the command groups and commands. For example, if a user clicks on a command group, a page is constructed showing the commands and other command groups, if any, listed for that command group. The page will also show information from the fields of the command group. For example, the verbose descriptive information may be shown on the same rendered page as a short name for a command, and may thus provide help information which presently is only available via a separate dialog box or window.

To restrict the scope of the particular pages in accordance with a user-specified search string, a "filter" may be set. To facilitate user navigation among the web of pages, the pages can also include "links", which are pointers to other commands or command groups (i.e., another node within the tree defined by the command group/command hierarchy). As a result of selecting (e.g., clicking on) a link, a command Other advantages will become apparent from the following detailed description when taken in conjunction with the drawings, in which:

BRIEF DESCRIPTION OF THE DRAWINGS

FIG. 7 is a representation of a drop-down recent page list for the page of FIG. 6;

FIG. 8 is a representation of steps in an exemplary navigation sequence as tracked in accordance with the present invention;

FIG. 9 is a representation of steps in a navigation sequence and the effects of those steps on a running applications list in accordance with one aspect of the invention;

DETAILED DESCRIPTION

Exemplary Operating Environment

Figure 1:
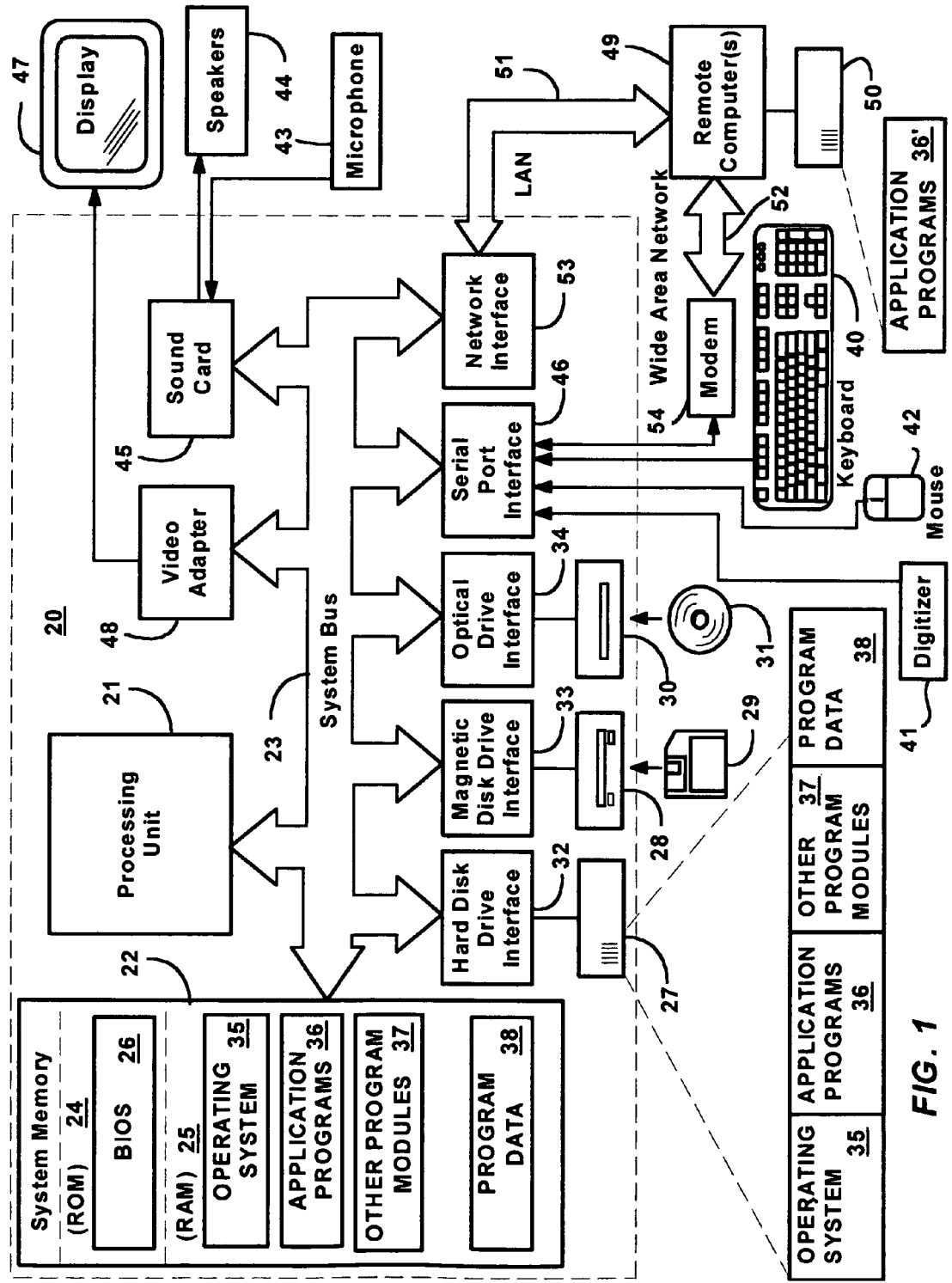
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which may store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and a pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Unified Navigation Shell User Interface

The present invention provides a navigation system 60 for a computer system such as the computer system 20. As described below, the navigation system 60 provides a shell user interface 62 that facilitates back and forth navigation between and within applications on the computer system 20.

Figure 2:
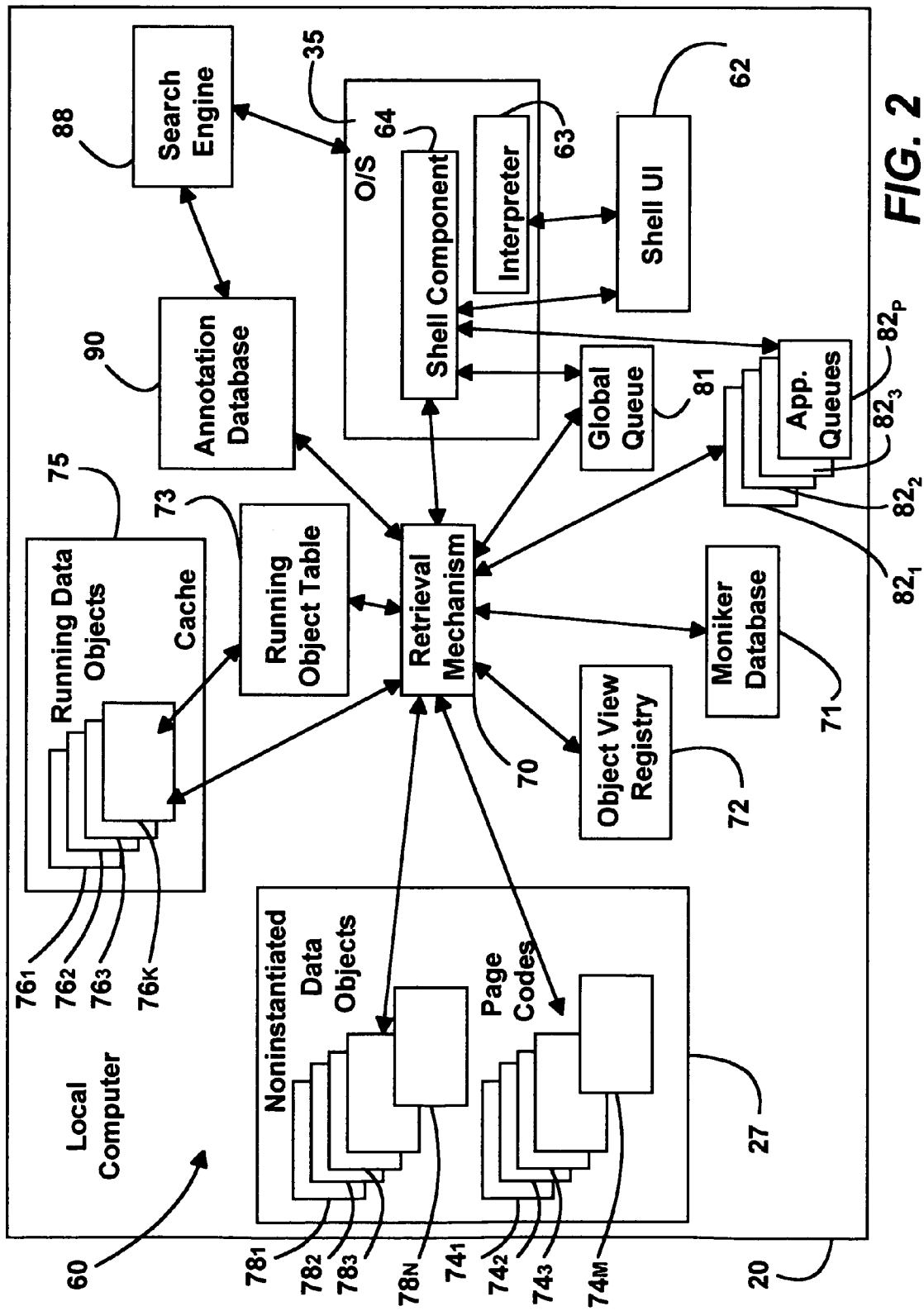
FIG. 2 is a block diagram representing a general architecture for a navigation tool in accordance with the present invention.

FIG. 2 shows an architecture for the navigation system 60 in accordance with the present invention. Although the navigation system 60 is shown as being installed in the computer system 20, components of the navigation system as described herein may be distributed among a plurality of computer systems. In addition, some or all of the various components referenced herein may be combined with or included within other components, while others may be separate from one another and may be appropriately invoked as needed.

The navigation system 60 includes a shell component 64 associated with the shell user interface 62. The shell component 64 is integrated into (or alternatively is external to and associated with) the operating system 35. The operating system 35 also includes a renderer, such as an XML or HTML interpreter 63, having network access software. Alternatively, the interpreter 63, may be external to the operating system 35.

Figure 3:
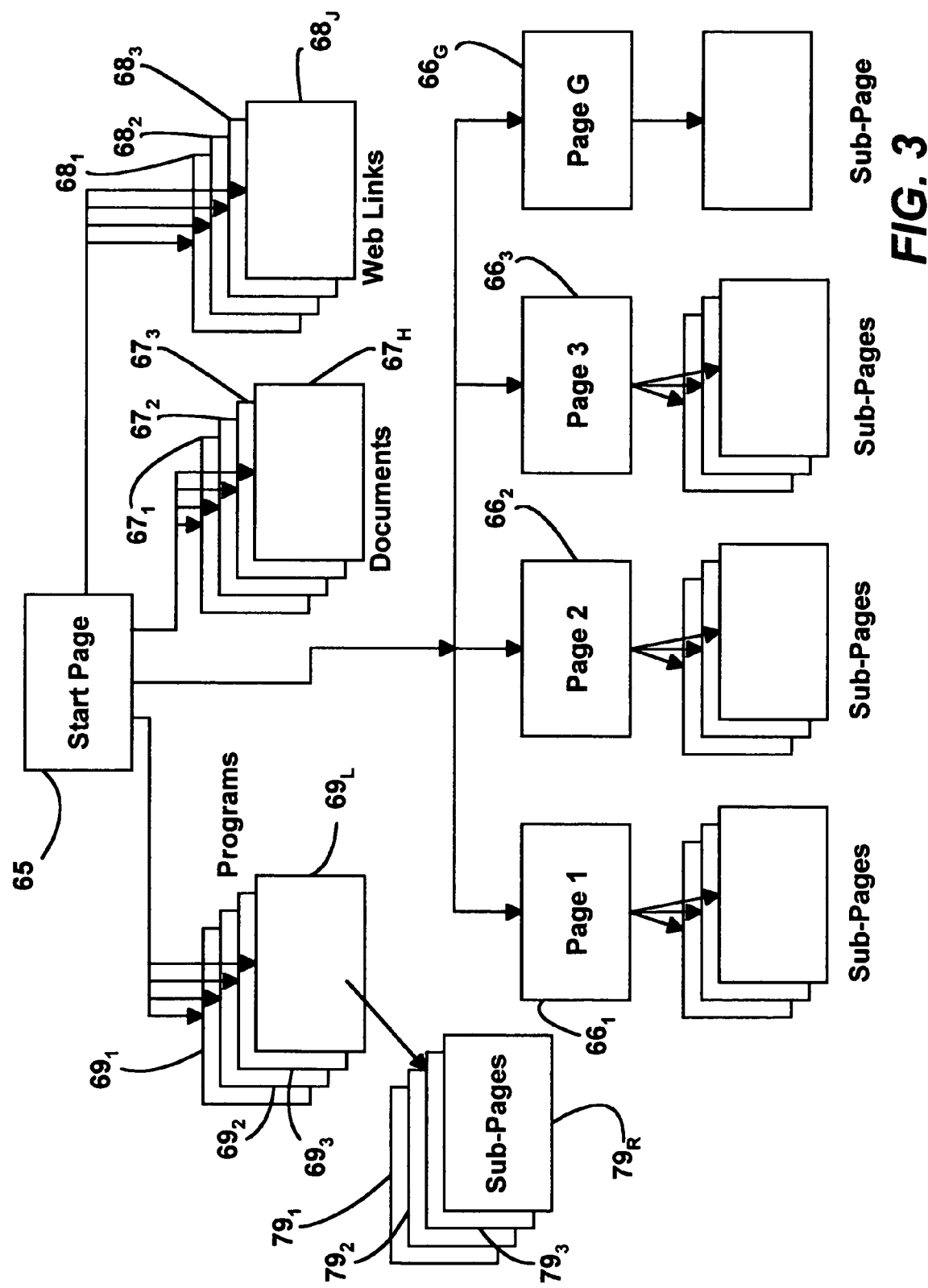
FIG. 3 is a representation of a page hierarchy for a multiple page user interface in accordance with the present invention.

In accordance with one aspect of the present invention, the shell user interface 62 includes multiple layers (e.g., organized in a hierarchical web) of pages to organize and display links to local and remote documents, programs, web links, tasks, services, devices, and the like. At the top level of the multiple-page shell user interface 62, a start page 65 (FIG. 3) provides access via hyperlinks to lower order pages $70_1$-$70_G$, as well as a number of local and remote documents $67_1$-$67_H$, web locations $68_1$-$68_J$, and programs $69_1$-$69_L$. The hyperlinks are displayed as headings, titles, icons, or the like, the selection of which provides access (via the shell component 64) to either a lower order page or local and/or remote programs, documents, web sites, services, or devices. The lower order pages $66_1$-$66_G$ preferably provide access via hyperlinks to sub-pages and more narrowly scoped documents, web locations, and programs. The sub-pages may provide further hyperlinks, and so forth. A shell user interface 62 is described, entitled "Multiple-Page Shell User Interface", filed concurrently herewith, and incorporated herein by reference.

In addition to the multiple pages 65, $66_1$-$66_G$ of the shell user interface, the programs and/or applications on the computer system 20 present their content and functionality to the user via pages $79_1$-$79_R$. The applications are thus represented by an arrangement of pages 79 that manifest the functionality of the application. For example, various functions of the application may be divided into tasks, with one or more separate task pages provided for each of the tasks. Tasks and task pages are further described in the "Multiple-Page Shell User Interface" application incorporated above. In addition to the task pages for an application, as is described further below, the various commands along with their corresponding help information and other command related information for the applications are preferably organized into separate pages (e.g., one page per command).

The shell user interface 62 facilitates navigation among and between pages 65, $66_1$-$66_G$ of the shell user interface, pages of the applications, and the command/help information pages. For example, via the shell user interface 62 of the present invention, a user can navigate from an application page 79 to a command page, back to the application page, and then to the start page 65.

The pages described herein are preferably HTML (Hypertext Markup Language) pages. HTML-created pages permit easy embedding of hyperlinks to web-based URLs or local references, and editing by a designer or a user. Note, however, there is no intention to limit the present invention to HTML, as virtually any page format language, e.g., XML (Extensible Markup Language) or DHTML (Dynamic HTML) or other page creation mechanism will suffice. A renderer (e.g., the interpreter 63) provides the mechanism to display the pages. If a format other than HTML, XML, or DHTML is used, then an appropriate mechanism for rendering that page format may be provided on the personal computer 20.

One possible default setting for the start page 65, the pages $66_1$-$66_G$, and the pages of the applications is maximization to the entire screen, so that the user is presented with a large, easy-to-read display. However, the start page 65 and the other pages may be sized by a user or a designer so that multiple windows or layered portions thereof can be simultaneously displayed.

Returning now to FIG. 2, the shell component 64 is associated with a retrieval mechanism 70. As is described further below, when a request is made by the shell user interface for a page, the retrieval mechanism 70 accesses information related to that page in a PAP (Persistent Application Page) database 71, an Object View Registry 72, and/or a Running data object Table 73. Based upon that information, an appropriate page code $74_1$-$74_m$ (e.g., including the HTML tags or static data that is used to implement a page), and page data 76 or 78 (e.g., a document or data object that is implemented by the page code) are retrieved. For ease of reference, the data, document, object or the like to which the page code is bound (e.g., for viewing or editing) is referred to herein as a "data object" 76 or 78. The data objects may be either running data objects $76_1$-$76_K$ or non-running (i.e., noninstantiated) data objects $78_1$-$78_N$. A noninstantiated data object 78, when instantiated, becomes a running data object 76. The running data objects $76_1$-$76_K$ are preferably stored within high-speed memory (e.g., a RAM cache 75), and the noninstantiated data objects $78_1$-$78_N$ are stored in persistent memory such as file storage (e.g., one or more hard disk drives 27).

Figure 4:
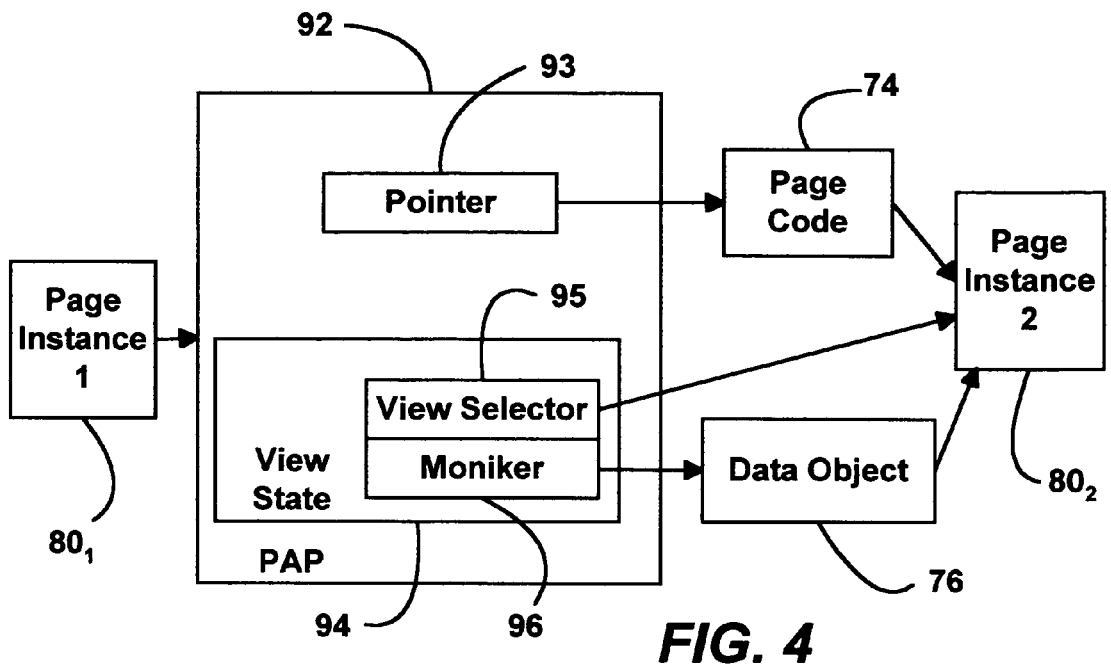
FIG. 4 is a block diagram representing creation of a second page instance from a first page instance in accordance with the present invention.

As represented in FIG. 4, an appropriate page code 74 and associated running data object 76 are combined to form a viewable page instance 80. In accordance with one aspect of the present invention and as is described further below, a global recent pages queue 81 maintains information about selected page instances 80 that have been displayed by the computer system 20. A plurality of application queues $82_1$-$82_P$ are also provided for maintaining information about selected page instances 80 that have been displayed by particular applications, i.e., a separate queue $82_1$-$82_P$ is maintained for each application.

The present invention also provides a search engine 88 that is associated with the shell component 64. As is described further below, in accordance with a query sent via the shell user interface 62, the search engine 88 references an annotation database 90, which includes annotation information regarding the data objects 76 and 78.

Page Codes and Data Objects

As described above, a page instance 80 is formed by combining page code 74 with a running data object 76. To this end, the page instance 80 is a visible instance of a binding of the page code 74 and the running data object 76. Preferably, the page codes 74 are stored separately from the data objects 76 or 78. This separation permits more than one page code 74 to be applied to the same data object 76 so as to form separate page instances of the same data, with the data object maintaining its identity across all page instances. That is, a data object 76 modified within one page code 74 is available, with the modifications, to other page codes. Likewise, a single page code 74 may be applied to more than one data object 76 or 78.

When a page instance $80_1$ (FIG. 4) is saved by the computer system 20, information about the page instance $80_1$ is captured in the form of a Persistent Application Page ("PAP") 92. The Persistent Application Page 92 may be saved to the PAP database 71, for example, and represents the binding of the data object 76 to that page instance 80. A page instance 80 may be saved in a variety of ways, such as explicit saving by a user, automatic saving by an application, or implicit saving by an action via the shell user interface 62 (described further below).

As can be seen in FIG. 4, the page instance information in the Persistent Application Page 92 includes a pointer 93 to the page code 74 for the page instance $80_1$, and a persistable form of the page instance, referred to as a View State 94. The pointer 93 is a reference to the location of the page code 74, such as in the form of an Uniform Resource Locator (URL) or the like. The View State 94 is unique to the particular page instance $80_1$, and includes a view selector 95 and a persistent reference to the data object 76 or 78, in the form of a moniker 96. As is described further below, the view selector 95 manages a decision process regarding the type of view that is to be provided and the condition of that view (collectively the "view state") for a particular page instance 80.

After the page instance $80_1$ is no longer viewable, to request a view of the page (i.e., a second page instance $80_2$ of the same data object 76 bound to the same page code 74), the retrieval mechanism 70 references the Persistent Application Page 92. The pointer 93 identifies the page code 74, and the moniker 96 accesses the respective data object 76 or 78. The running data object 76 is then bound to the page code 74, and the second page instance $80_2$ is displayed according to view information selected by the view selector 95. If the data within the data object 76 has changed since displaying the first page instance $80_1$, the changed data will be displayed in the second page instance $80_2$ (assuming the data is part of the visible portion of the page instance $80_2$). As is described further below, the view selector 95, in conjunction with other sources, may dictate that the view of the second page instance $80_2$ be different than the view of the first page instance $80_2$.

For a moniker 96 to bind to a data object 76, the data object needs to be running, i.e., the data object must be a running data object 76 within the cache 75. To this end, monikers 96 work in conjunction with the Running data object Table 73 to either create a new running data object 76 (i.e., instantiate a noninstantiated data object 78) or locate an existing running data object, as appropriate. The Running data object Table 73 manages the lifetime of running data objects 76 and ensures mapping between the moniker 96 and the appropriate running data object 76. To this end, the Running data object Table 73 includes a hash table of currently running data objects 76, keyed by their monikers 96.

The view selector 95 manages a decision process regarding the type of view that is to be provided and the condition of that view (collectively the "view state") for a particular page instance 80. As examples of view state information, an e-mail message object may be displayed in a full-page view or in a different short search-result view. A word processing document may be presented in a maximized window with a view of the document, or alternatively in a partially minimized window. The beginning of the document may be displayed, or some other portion of the document may be displayed, i.e., partially scrolled through the document. As is described further below, the view selector 95 may include and may apply its own view state, or may apply view state information maintained by another source. The view selector 95 is preferably bound to the moniker 96, and is invoked when the moniker initiates binding with the appropriate running data object.

While the view selector 95 is ultimately in control of how page views on a running data object 76 are created, a default page view for a running data object may be provided in a registry, such as the Object View Registry 72. The Object View Registry 72 maintains a mapping between data objects (or data types) and default views for the objects. A new or customized view for any combination of a running data object data type and a view category may be registered with the Object View Registry 72. The view selector 95 may apply the default view supplied by the Object View Registry 72, or may use other view information as described below.

Figure 5:
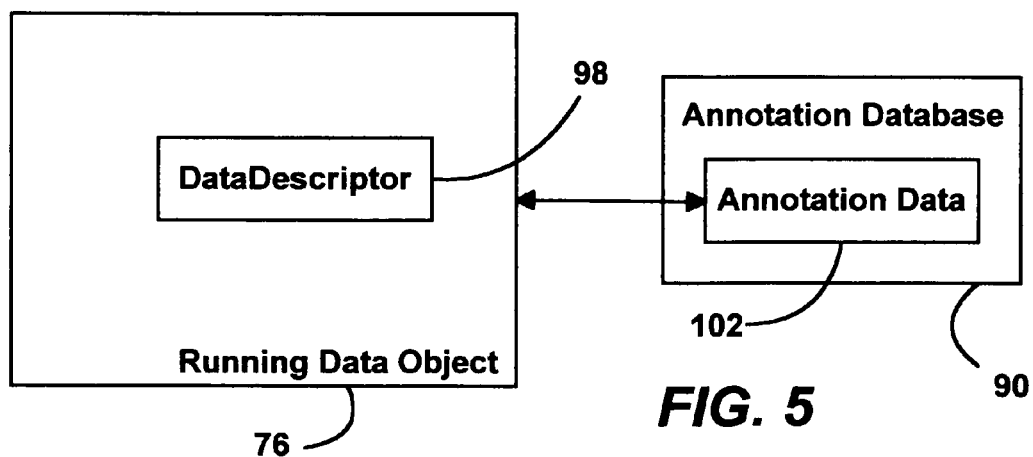
FIG. 5 is a representation of a running data object for use in the present invention.

A running data object 76 may include information about a default view for that object therein, and the view selector 95 may apply that information in conjunction with, or to override, the default view provided in the Object View Registry 72. For example, a DataDescriptor 98 (FIG. 5) may be maintained within or associated with (e.g., as metadata) a data object 76 or 78. The DataDescriptor 98 preferably includes information that identifies the data object's class and/or provides descriptive information about the object's data type, and, if so, then the Object View Registry 72 may be used to match the class or type information with an appropriate view. Alternatively, the DataDescriptor 98 may directly provide a view to override the default view in the Object View Registry 72.

The view selector 95 may include its own built-in view or views, which the moniker 96 may implement instead of the default view provided by the Object View Registry 72 or DataDescriptor 98 (if available). In addition, information about views may be saved into the annotation database 90, and that information may be used by the view selector 95.

More particularly, sometimes information about data objects 76 or 78 cannot be written into the data objects. For example, a data object may be designated read-only. It may be desirable to maintain information about the data object, however, so that the information may be queried by the computer system 20 or a user. To this end, the present invention maintains annotation data 102 (FIG. 5) associated with, but not written into, some of the data objects 76, 78. The annotation data 102 is maintained in the annotation database 90, and may be accessed and/or queried via the retrieval mechanism 70, the search engine 88, or another component if necessary. Examples of items that may be maintained in the annotation database 96 include text relevant to a free-text search or heuristically-recognized properties (e.g., author, subject, or type). In addition, cross-object relationships (e.g., embeddings or links) may be maintained, which can be used to extend search logic (i.e., the search finds direct or close hits and returns the hits along with items that are linked to the hits). Information may also be saved in the annotation database 96 about the most recently used or the most frequently used views for a data object. This information may be used (e.g., by the view selector 95) to determine an appropriate view for the page instance 80. A user may also generate information (e.g., electronic sticky notes, etc.) about a data object 76 or 78 that is added to the annotation database 96.

Multiple monikers 96 may bind to the same running data object 76. To manage lifetimes of running data objects, each time a moniker 96 binds with a running data object 76, the running data object's reference count is incremented. Likewise, when a binding with a moniker 96 is released, the reference count of the running data object 76 is decremented. When a running data object's reference count becomes zero, it notifies the Running data object Table 73, which can elect to flush the running data object 78 from the cache 75 according to some caching policy, for example based upon available cache space and/or a most frequently used algorithm and/or the time the running data object 76 has been in the cache with a zero reference count.

For example, multiple monikers may bind to the same object for a two-phase commit transaction context. A two-phase commit transaction requires that all parties to a transaction sign off on the transaction before it is committed. Multiple monikers may also bind to a single running data object 76 that changes in response to external events (e.g., stock quotes), is modified by one or more page codes 74, or is part of a database with nontrivial record interdependencies. To manage such occurrences, the present invention defines a protocol for synchronizing access to a running data object 76. To this end, a moniker 96 requests a running data object 76 for a cloned proxy to itself, which exists only for the duration of a transaction. Several such proxy objects can be tied to the same transaction context. A "commit" is atomic with respect to all transactions outside of the context. Proxy objects can themselves be proxied; in effect, this allows for nested transactions.

As can be understood, view information may be provided by a variety of sources, and the priority of the type of view to be shown may be determined as desired by a designer. However, in one implementation, it is preferred that the view information adopted by the view selector 95 be substantially identical to the view information for the page instance 80 that created the Persistent Application Page 92, so that a page instance created from the Persistent Application Page appears substantially the same as the original page instance.

Navigation Bar

A representation of a screen shot 98 for the shell user interface 62 is shown in FIG. 8. The screen shot 98 includes a navigation bar 100 extending along the top of the screen, and a page instance viewing area 102 that extends across the remaining portion of the screen. Alternatively, the navigation bar 100 may be located elsewhere on the screen, e.g. on the bottom or sides, with the user given the option to choose. In a preferred embodiment, the navigation bar 100 is visible through most of the range of scenarios and interactions offered on the computer system 20, although an auto-hide feature or the like may be implemented. The page instance viewing area 102 provides a location for display of one or more of the pages 65, 66 of the shell user interface 62 or a current page instance 80 from an application or program. If more than one page is displayed, the multiple pages may be layered, tiled, or may be presented in another convenient manner.

The navigation bar 100 includes, at a far left side, a back button 104 and a forward button 106. A start page link 108 is located on the navigation bar 100, such as adjacent to the forward button 106. A running applications list 110, having a number of application links 1121-1124 to applications or web sites (described further below), may be located just the right of the start page link 108, and extends across the navigation bar 100 to a middle portion of the right side of the navigation bar 100. At the right end of the navigation bar 100, adjacent to the running applications list 110, is a recent applications page link 114.

Some of the buttons may have drop-down menus or the like associated therewith. Such application links 112 may have a drop-down button (e.g. the drop-down button 115 in FIG. 7) adjacent thereto. As shown in FIG. 7, selecting a drop-down button 115 opens a recent page menu 116 (FIG. 7) for the corresponding application or web site. The recent page menu 116 includes a number of recent page links 1181-1185, an application website link 120, and a "More . . . " link 122. Alternatively, the recent page menu may be caused to automatically open by moving the pointing device over the application link 112, possibly requiring that the pointer remain over the application link for a period of time before opening the menu 116. In any event, the application links 112 on the page menu may then be selected.

Navigation via the Navigation Bar

The back and forward buttons 104, 106 provide back and forth navigation across a large range of pages that have been visited via the shell user interface 62. To this end, a unit of measure, called a "place" is defined. A place is a page instance 80 or a page 65, 66 in the shell user interface 62 that includes information maintained in the global queue 81. The global queue 81 maintains information about the places, thereby forming a travel log of previously visited places. As described below, the back and forward buttons enable the user to navigate among places in the travel log.

Each application may determine which page instances 80 created by that application are places for that application that can be logged. As stated above, at least some of the applications that are accessed by the shell user interface 62 are presented as a web of pages that display the tasks, commands, help information, and other functionalities provided by the application. Not all of these pages are necessarily maintained in the global and/or application queues 80, 82. For example, page instances 80 that are created from a particular task page may be included in the application queue 82 and/or the global queue 80, but dialog pages (e.g., equivalent to a dialog box), may not be included.

The shell component 64 may define places for applications that were developed prior to implementation of the shell user interface 62 ("legacy applications"). For example, the shell component 64 may define that a document or web page accessed via a legacy application defines a place, but a dialog box does not. Some applications (e.g., Microsoft Corporation's Word 2000) utilize a single document interface (SDI), wherein there is one window per document. For SDI applications, each document may be defined by the shell component 64 as a separate place. Other applications (e.g., Microsoft Corporation's Photodraw photo editing program) utilize a multiple document interface (MDI), wherein there is one top-level window and several lower-level (child) windows bounded by the top level window. The shell component 64 may tag the child windows as documents rather than dialog boxes, so that visits to multiple child windows constitute separate places within the travel log, whereby the multiple child windows may be revisited via back and forward navigation. The back and forward buttons 104, 106 are then available for navigation along with the display of the legacy application.

Figure 6:
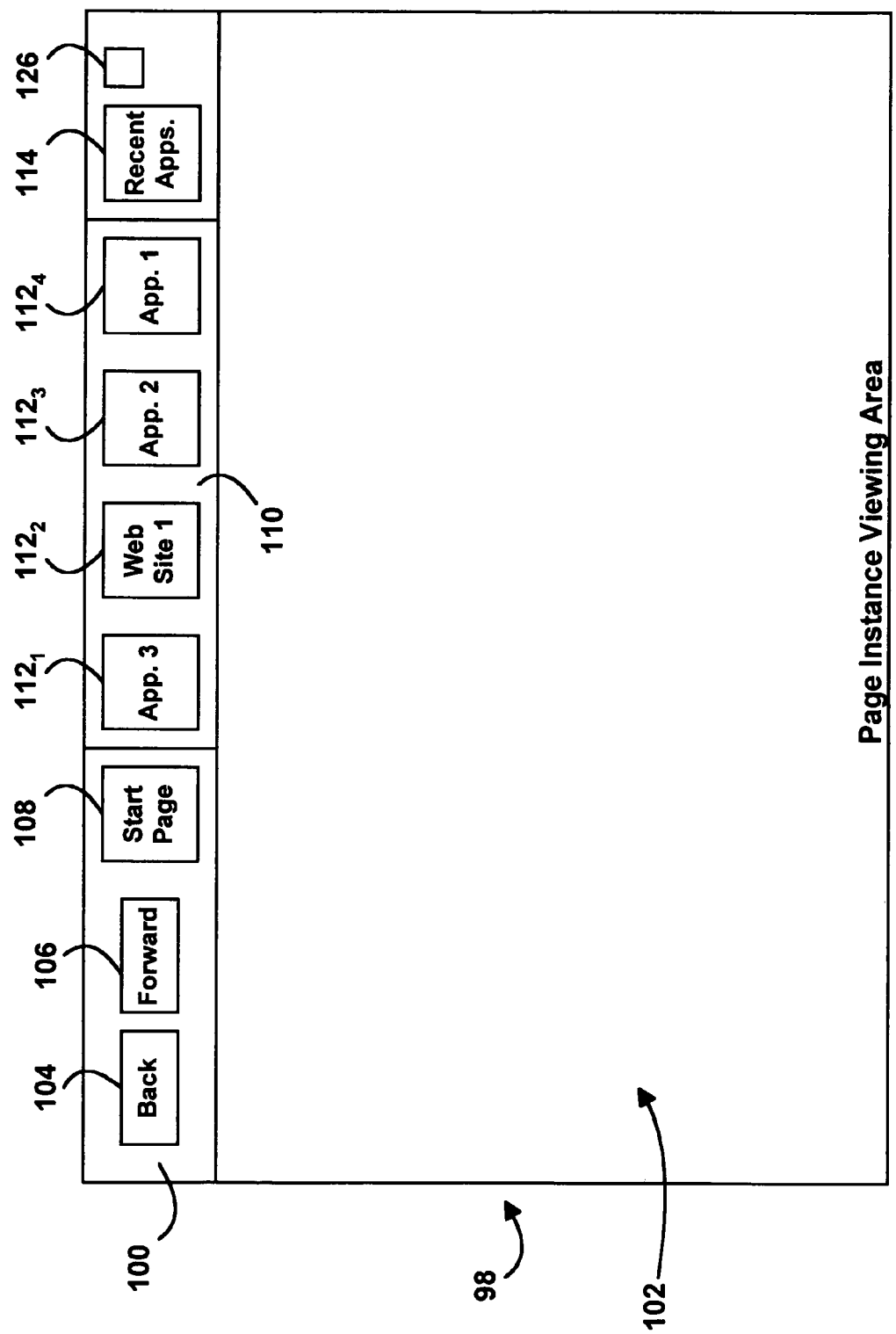
FIG. 6 is a representation of a rendered page for the user interface of FIG. 2.

When a request for a legacy application is made via the shell user interface 62, the legacy application sometimes provides calls to the shell component 64 that are not consistent with the unified navigation described herein. For example, a legacy application may request a separate window that would cover at least part of the navigation bar 100. To address such calls from legacy applications, the shell component 64 may suppress the calls and/or reroute the calls to other drawing functions of the shell component, so that, for example, the legacy application may be displayed, preferably maximized, in the page instance viewing area 102 (FIG. 6).

Animations may be provided so that a user is aware that a navigation between places is occurring, which may not be readily apparent to a user when navigating between places in the same application. For example, an icon 126 (FIG. 6) may be provided in the navigation bar 100 and may flash or the display may otherwise change state when a navigation between places occurs.

Each time a page instance 80 corresponding to a place is saved, information about that page instance 80 or that page instance's Persistent Application Page 92 is written into the global travel queue 81. In addition, information about the page instance 80 and/or the Persistent Application Page 92 is written into the application queue 82 for the application. Alternatively, the Persistent Application Page 92 itself may be written into the respective queues 81, 82.

The back and forward buttons 104, 106 may be used to navigate between places in the global queue 81. In general, selecting the back button 104 navigates a user to the previous place in the global queue 81. Selecting the forward button 106 navigates a user to the next place in a sequence of places (if present). If a place is not available, a visual indication (e.g., gray out respective button) may be provided on the display.

To retrieve a page instance 80 as a result of a request via the shell user interface 62 (e.g., by selecting the "back" button), the shell component 62 accesses the global queue 81 to determine the appropriate place based upon the current place. The Persistent Application Page 92 is called and, in return, the moniker 96 retrieves the associated running data object 76 and view selector 95 and binds it to the page code 74. The running data object 76 and the page code 74 are combined to display the page instance 80 in accordance with view information dictated by the view selector 95. Note that although not shown, one or more options (e.g., extra buttons and/or a drop-down menu) may be provided to navigate multiple places in the queue with a single click.

An example of a simple navigation sequence 130 is shown in FIG. 8. In the navigation sequence 130, a shell user interface 62 displays seven consecutive pages 132-144. The pages 132-136 and 140-144 are places, however the page 138 is not a place and thus is not entered in the global queue. As a result, navigation using the back and forward buttons 104, 106 navigates the user between displays of all the pages except for the page 138 that is not a place. That is, in the present example, hitting the back button while the page 140 is displayed causes the page 136 to be displayed instead of the page 138. Likewise, hitting the forward button while the page 136 is displayed navigates the user to the page 140.

The start page link 108, which is preferably persistent on the navigation bar 100, navigates the user to the start page 65. Information about the start page 65 is then written into the global queue 81. The user may then used the back button 104 to return to the previous place, or may select a hyperlink that is presented on the start page 65.

The running applications list 110 includes an application link 112 for a defined number of applications and/or web sites that have been recently visited by a user, and have not been closed by the user. Some applications that provide a plurality of services may provide a plurality of application links (e.g., an email program may provide an address list link, an inbox link, and/or a calendar link). Included in the running applications list 110 is the presently displayed place.

The application links 112 may be represented as icons, headings, or the like, or as thumbnail representations of the last place visited in the respective application or web site, with a representative icon or the like representing the respective application or web site. The number of application links 112 displayed in the running applications list 110 may be fixed or variable (e.g., based on the current screen width). If the number is fixed, the application links 112 may shrink to fit the size of the running application list 110.

FIGS. 9A-9E represent one manner of maintaining the running applications list 110. In accordance with one embodiment of the present invention, upon start-up of the computer system 20, the applications list 110 (FIG. 9B) is empty. Alternatively, application links 112 from the previous session may be persisted in the running applications list 110. When a first place 150 (FIG. 9A) is visited in a first application or web site, an application link $112_1$ representing that place (and the corresponding application or web site) is placed in the left-most location in the running applications list 110. As additional places 152, 154 (FIG. 9A) are visited, if the running applications list 110 is not full, then links $112_2$ and $112_3$ (FIG. 9B) are added (in order of navigation) to the left side of the running applications list 110. Existing application links 112 index toward the right. This process continues until all of the available slots are filled (FIG. 9C).

When the running applications list 110 is full, visiting a new place causes a new application link 112 to replace an old application link. If the application or web site associated with the new application link $112_5$ is already represented in the running applications list 110 (e.g., the place 158 visited in FIG. 9A), then the new application link $112_5$ may replace the old application link $112_1$ for that application. That is, the more recently visited place 158 is represented by the application link $112_5$. The previous application link $112_1$ is moved to the recent application page menu 116 (i.e., as one of the recent page links $118_1$-$118_5$ in FIG. 7). The application link $112_5$ is preferably shown as a thumbnail representation of the more-recently visited place 158. If the application associated with the new application link 112 is not represented in the running applications list 110 (e.g., place 160 visited in FIG. 9A), the new application link $112_6$ (FIG. 9E) preferably replaces the least-recently-used application link $112_3$ in the running applications list 110.

The running applications list 110 may be maintained using alternative heuristics. For example, the running applications list 110 may be maintained in strict temporal order. That is, application links 112 are added on the left, and old items fall off the right side. This may be true even if the same application is represented several times in the running application list 110. Also, if desired, one or more slots in the running applications list 110 can be determined by a most frequently used heuristic, which persists links to applications that are the most frequently used applications. In addition, if desired, a mechanism may be provided by which a user locks the position of an application link 112 in the running applications list 110.

As described above, if another place is visited within an application or web site already represented on the running applications list, that place may become the current application link 112 representing the application or web site. If desired, however, when the running applications list is not full, the second place for the application may represent a second application link 112 in the running applications list 110. When the running applications list 110 becomes full and an additional application or web site is visited, the two places may roll into one application link 112 to permit room for a new application link. In addition, if desired, particular places in selected applications or web sites (e.g., a document in a word processing application) may represent a separate application link 112 in the running applications list 110. The application links 112 representing the particular places are added and removed as if they were application links to separate applications (e.g., according to the most-recently-used heuristic).

If an application or web site is closed, the application link 112 for the application or web site is removed from the running applications list 110. The vacated slot in the running applications list 110 may remain empty, or an application link 112 that had previously been dropped out of the running applications list may be added back to the list (e.g., the most recently visited application that was dropped from the list). The application link 112 added back to the running applications list 110 may fill the previously empty slot, or may be added to the right side of the list, indexing application links in list to the left, if necessary. Alternatively, the empty slot may remain blank until a new application is selected and the new application fills the blank location.

Occasionally, consecutive navigations via the back button 104 causes a user to navigate to an application that is no longer shown in the running applications list 110. In doing so, an application link 112 for that application or web site is placed back in the running applications list 110. The new application link 112 may be added according to a heuristic, e.g., take place of the least-recently-used application link in the running applications list 110, be placed on the list in accordance with a strict temporal order, or any other heuristic such as one described above.

As can be understood, a user that spends a lot of time surfing the Internet may quickly replace all application links 112 in the running applications list with new application links for recently visited web sites. To prevent this from occurring, the number of application links 112 directed to web sites may be limited to a particular number (e.g., three), or other limitations may be placed on the links to web sites that are placed in the running applications list 110. For example, if a user is viewing web pages that are accessed via links from a portal website, the story pages may be grouped in a single application link 112 with the application link to the portal website. As another example, all websites/pages that are accessed via the same set of search results may be grouped into one application link 112.

Returning to FIG. 7, selecting an application link 112 navigates to the place (e.g., a web page or document) represented by that application link. Likewise, selecting one of the recent page links $118_1$-$118_5$ from the recent application page menu 116 navigates to the place represented by that recent page link. Selecting the application website link 120 navigates to the web site for the application or the home page for a web site.

Figure 10:
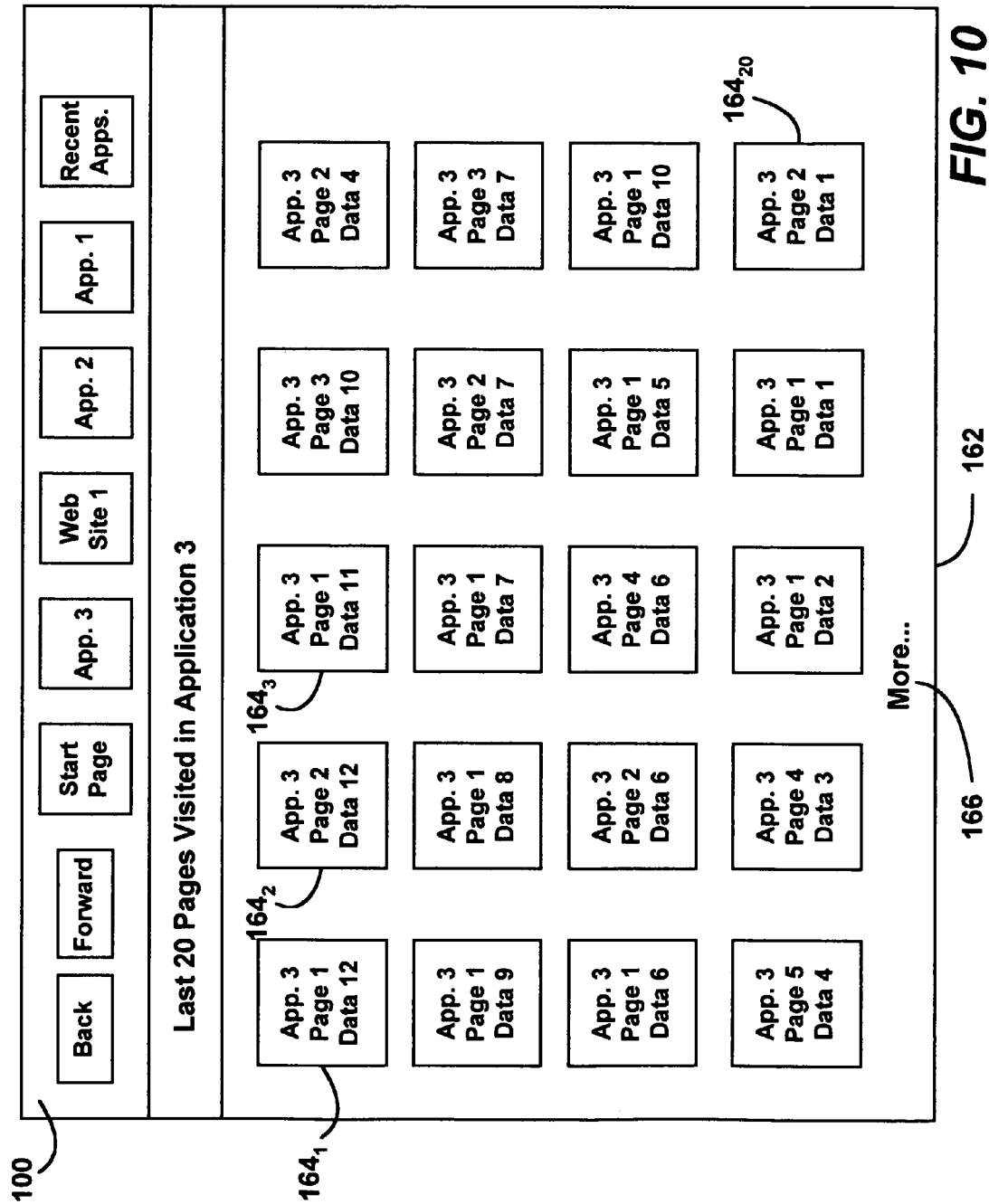
FIG. 10 is a representation of a screen shot of a recent places page in accordance with the present invention.

Selecting the More link 122 navigates to a recent places page 162 (FIG. 10), which displays links 164 to a number of recent places for the application or web site. The places may be maintained by the application queue 82 for the respective application or web site. The links 164 may be presented as list of headings, a group of icons, or the like, but preferably are represented as thumbnail representations of the places. In the embodiment shown in FIG. 10, twenty links $164_1$-$164_{20}$ are shown, but any number by be defined by a designer, the user and/or the sizing of the recent places page. If more places are available than displayed, a More link 166 enables navigation to additional places, which may be displayed on an additional page or pages.

Figure 11:
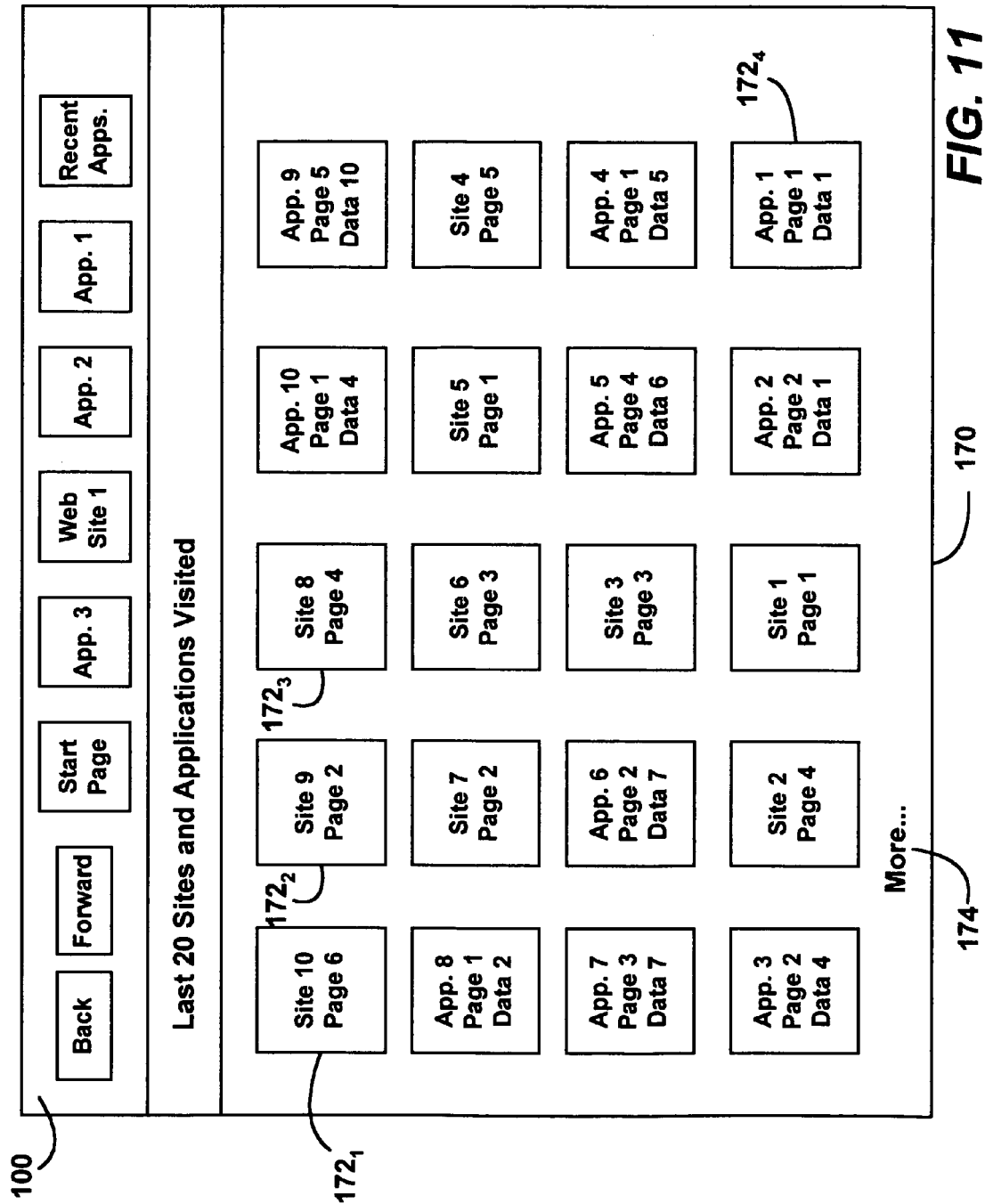
FIG. 11 is a representation of a rendered recent applications page in accordance with the present invention.

Selecting the recent applications page link 114 navigates the user to a recent applications and web sites page 170 (FIG. 11). The recent applications and web sites page 170 displays a defined number of links 172 representing the most-recently-displayed applications and web sites. In the embodiment shown in FIG. 11, links $172_1$-$172_{20}$ to the twenty most recent applications and web sites are shown. The links 172 may be represented as a list of headings, groups of icons, or the like, but preferably are displayed as thumbnail representations of the applications or web sites. Selecting one of the links 172 displays the recent places page 162 for the application. Additional applications and web sites may be viewed (e.g., via additional pages or a page) by selecting a More . . . link 174.

Travel Log Maintenance

As stated above, the global queue 81 maintains a travel log of previous places accessed by the shell user interface 62. Similarly, each application queue 82 preferably maintains a travel log of previous places accessed by the respective application.

Figure 12:
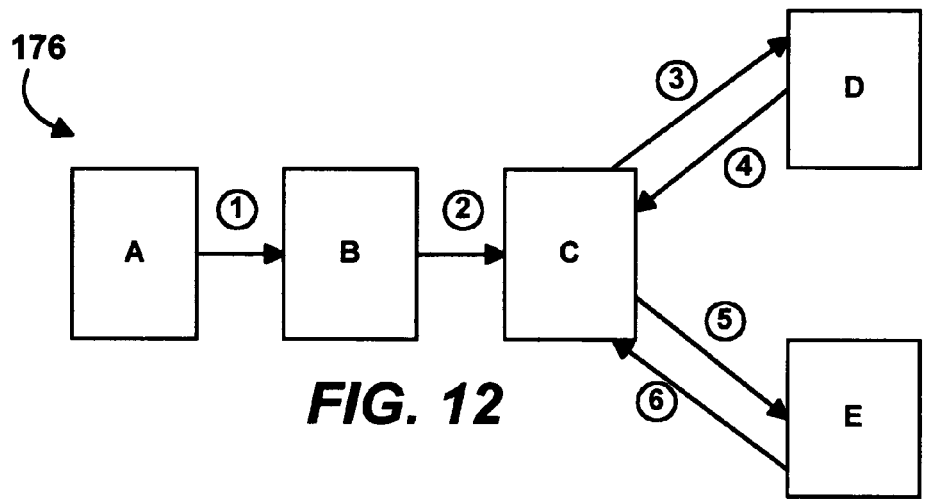
FIG. 12 is a representation of steps in a navigation sequence in accordance with an aspect of the present invention.

Certain sequences of navigations by the user interface 62 provide a variety of different options for maintenance of the travel log for the global queue 81 and/or an application queue 82. For example, FIG. 12 shows a navigation sequence 176 between five places A, B, C, D, E in the following order: A, B, C, D, C, E. Selecting the back button 104 (FIG. 6) at the place E navigates to the place C. However, selecting the back button 104 at the place C provides a variety of alternatives. For example, if the global queue 81 maintains the travel log in a strict temporal order, then four successive selections of the back button 104 from the location C results a navigation as follows: D, C, B, A. Alternatively, a "pruning method" may be utilized for maintained the travel log, in which navigations between two visits to a single place are removed from the travel log. If the pruning method is used, selecting the back button 104 three consecutive times from the place E results in a navigation having the following order: E, C, B, A.

Another alternative for maintaining the travel log is a "single revisit model". Under the single revisit model, places within a navigation are placed in a temporal order, and duplications of places are removed from the temporal order. Thus, four successive selections of the back button 104 from the place E results in a navigation as follows: E, C, D, B, A.

In one embodiment, the default maintenance for the travel logs is the single revisit model. However, some sequences of pages (e.g., wizards and pages with a strong spoke and hub relationship) are better served by the pruning method. Applications and/or web sites may define which maintenance heuristic is to be used for individual collections of pages. Alternatively, rules may be defined by the shell component 64 or the queues 81, 82 that anticipate sequences of pages that are best served by an alternative heuristic. For example, the pruning method may be utilized as a default for navigations between web pages, but the single revisit model may be used at web site boundaries. As another example, wizards and pages with a strong spoke and hub relationship may be better served by the pruning algorithm for the travel log.

The shell component 64 may also access the queues 81 in response to a selection via the shell user interface 62 of something other than the back or forward buttons 104, 106. For example, if a link to an application is selected, the shell component accesses the queue 82 for the application, and the most recent place for the application is accessed. Alternatively, a default page for the application is displayed. As an example, if a user is in an email program preparing an email for sending, navigates to a word processing document, and then clicks on a link for email (provided on the navigation bar, for example), accessing the application queue 82 directs the user back to the email that is being prepared. Alternatively, the link may direct the user to the Inbox for the email program (or may open the email program in another default page). A problem exists in the latter scenario if the Inbox and the draft email are considered to be in the same application for purposes of the travel log in that the single revisit model will not allow navigation via the back button 104 to the screen where the email was being prepared. A user would instead have to navigate to the screen via the email application's travel log (i.e., as described below, via the email application's recent application menu 116 or recent places page 162).

The shell user interface 62 may be used in a multiple window environment, i.e., there may be multiple instances of shell user interfaces 62, each of which corresponds to a window. In such operation, the navigation bar 100 is preferably provided for each window. A separate travel log is maintained for each window, as well as a separate running applications list. If a legacy application is utilized, and that legacy application uses a floating window, then controls similar to those in the navigation bar 100 may be presented in a window atop the floating window. Preferably, an applications queue 82 specifically for that application is utilized for navigation within the floating window.

In accordance with another multiple window embodiment, each application program that is running on the computer may be in a separate window. In such a mode, a navigation bar is preferably provided for each window. When utilizing the back and forward buttons 104, 106 at a first place, a request for a second place displays the second place in the current window if the second place is associated with the same application window as the first place. If the second place is associated with a second application window (e.g., of another application), then selecting the appropriate button 104, 106 navigates the user to the second application window. The user may then navigate using the back and forth buttons 104, 106 that are provided in the window for the second application, which may, for example, navigate the user back to the first application window, to a third application window, or to another place in the second application window.

As stated above, the present invention preferably utilizes an implicit save feature that saves modifications to the data object 76 and/or view information when a navigation away from a page instance 80 is made. The implicit save feature permits a user to navigate away from a page instance 80 without being concerned about losing revisions to the information in the page instance. For a legacy application that does not permit implicit save, a dialog box or the like may be used to inform a user that a save should be made before a navigation occurs.

Presentation of Command and Help Information

Figure 13:
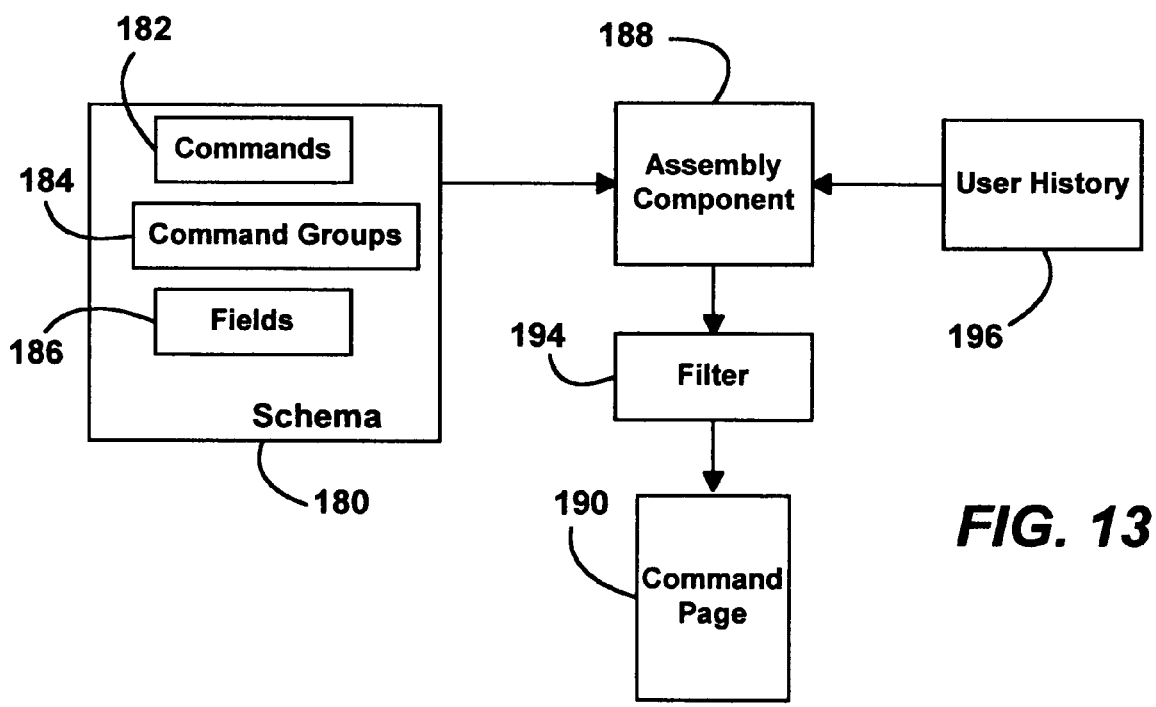
FIG. 13 is a block diagram representing assembly of a command page in accordance with an aspect of the present invention.

Another aspect of the present invention is directed to converting commands and help information of an application (presently presented in dialog boxes, pop-up menus, and the like) into a web of command pages. To this end, each application has command information defined therewith according to a defined command schema 180 (FIG. 13). In the command schema 180, commands 182 are grouped into command groups 184, and attributes ("fields 186") are defined for each of the commands and command groups. An assembly component 188 utilizes the command schema 180 to construct a command page 190 or command pages.

The fields 186 represent, for example, items that may be displayed on a command page that represent the command or the command group (e.g., titles and icons), search terms for finding the command group in a textual search, verbose descriptive information about the command or command group, and the context in which the commands or command groups may be displayed (e.g., application pages). Note that the fields such as the verbose description field may include textual, audio, audiovisual, graphical, animation, and/or other information (or links thereto) capable of being sensed by a user.

For example, the schema may include the following fields:

| Field Name | Data |
| --- | --- |
| short name | one or two word name |
| long name | short phrase |
| verbose description | short paragraph |
| icon | a toolbar icon |
| search terms | hidden text used for a command search |
| Valid contexts | application pages (contexts) for which the command is valid |

As an example, the following fields may be defined for a "search" command for an email application:

| Field Name | Data |
| --- | --- |
| short name | search |
| long name | search my mail |
| verbose description | This command will allow you to search through all of your mail and find any messages that are still stored on your computer. You can view your mail by date, sender. Or, if you remember a word or phrase in the mail you're looking for, you can type that in and see a list of only mail containing the text you've specified. |
| icon | <bitmap> |
| search terms | find, seek, view, look, see |
| valid contexts | all pages |

Figure 14:
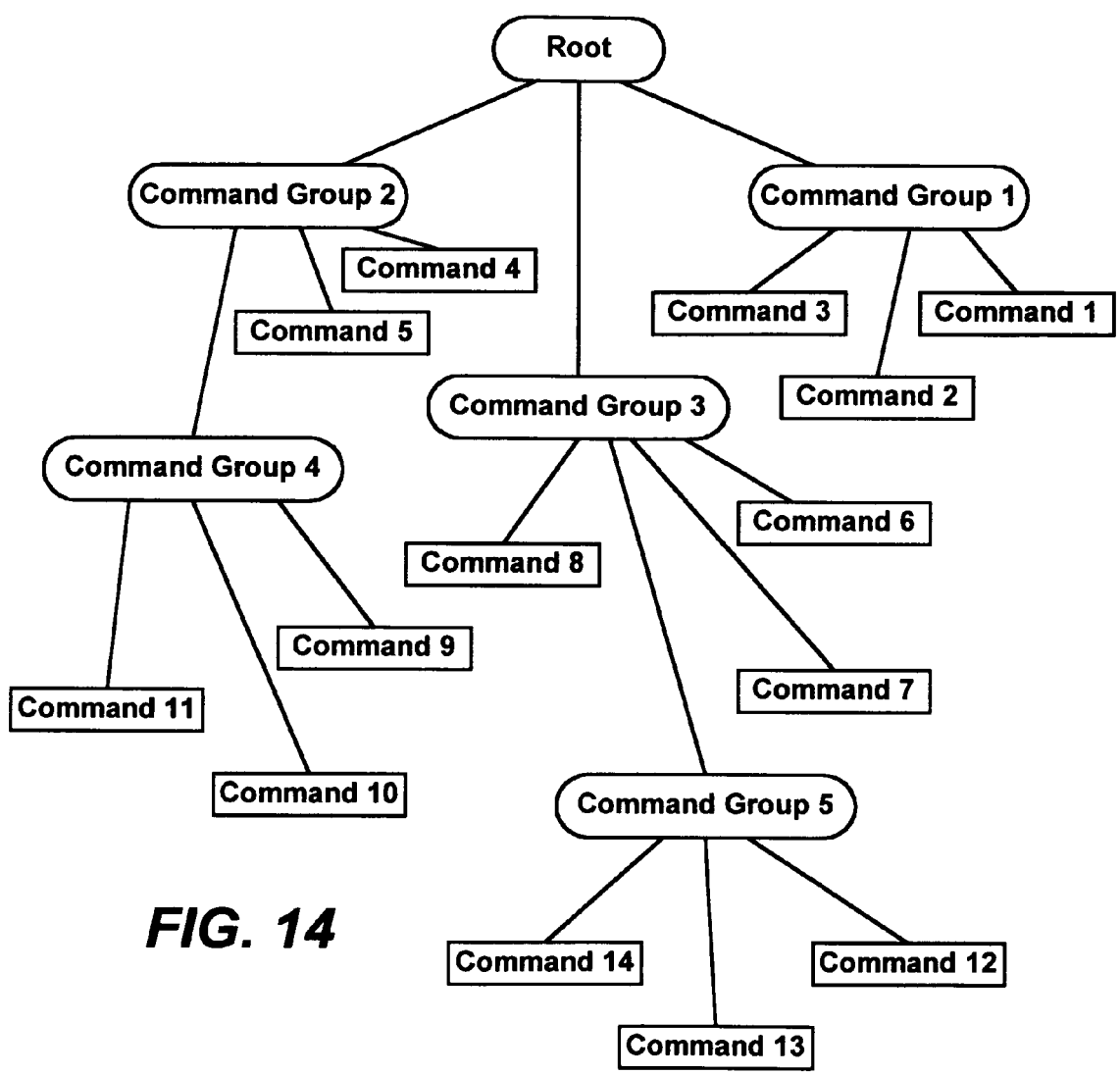
FIG. 14 is a representation of command node tree formed in accordance with an aspect of the present invention.

A node tree 192 (FIG. 14) is constructed by the assembly component 188 that represents commands 182 and command groups 184 that are available to an application. Some command groups 184 include both commands 182 and command groups, while other command groups include only commands. The assembly component 188 maps nodes of the node tree to particular contexts in the application based upon the schema information.

When a user requests commands 182, or the application wants to show the user some subset of the commands, the identifying parameters for building a command page 190 are: 1) the current application context, and 2) a node in the node tree 192 at which to begin the construction of the command presentation. Using the node tree 192, the assembly component 188 programmatically constructs the command page 190 for a particular context of an application. The assembly component 188 walks the command node tree 192 and, by applying visual style templates to the command and command group fields 186, creates the command page 190. For example, a command page may be constructed beginning from the node for the Command Group 3 in FIG. 14. The command page has the Commands 6-8, 12-14 and Command Groups 3 and 5 available for display.

A "filter" 194 may be set, to restrict the scope of the command information shown on the command page 190 in accordance with a user-specified search string. For example, the command page 190 may have been created in response to a search query directed to particular command information that is more limited than the commands available at the context at which the request was made.

The assembly component 188 may also use a user's past history 196 of command usage in order to customize the presentation (e.g., to emphasize frequently used or recently used commands). Commands may be bubbled up on the command page 190 in accordance with the past history 196 (e.g., as prominent icons). The assembly component 188 may also take into account the applicability of the current selection to hide or emphasize particular commands or command groups. For example, if the user selects a table, and then requests a command, an "add rows/columns" command may bubble up at the top of the command page 190.

Figure 15:
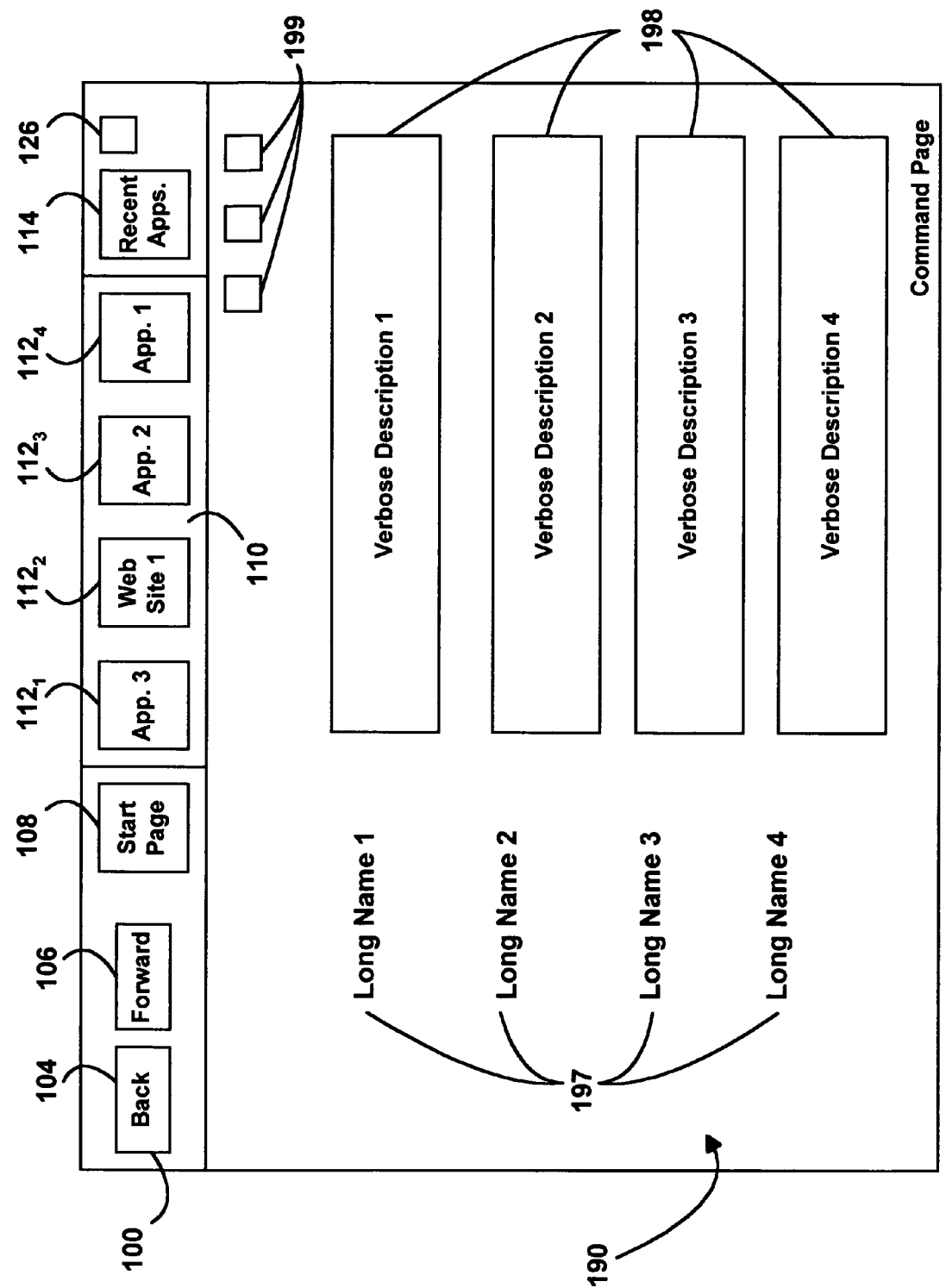
FIG. 15 a representation of a rendered command page in accordance with the present invention.
Figure 16:
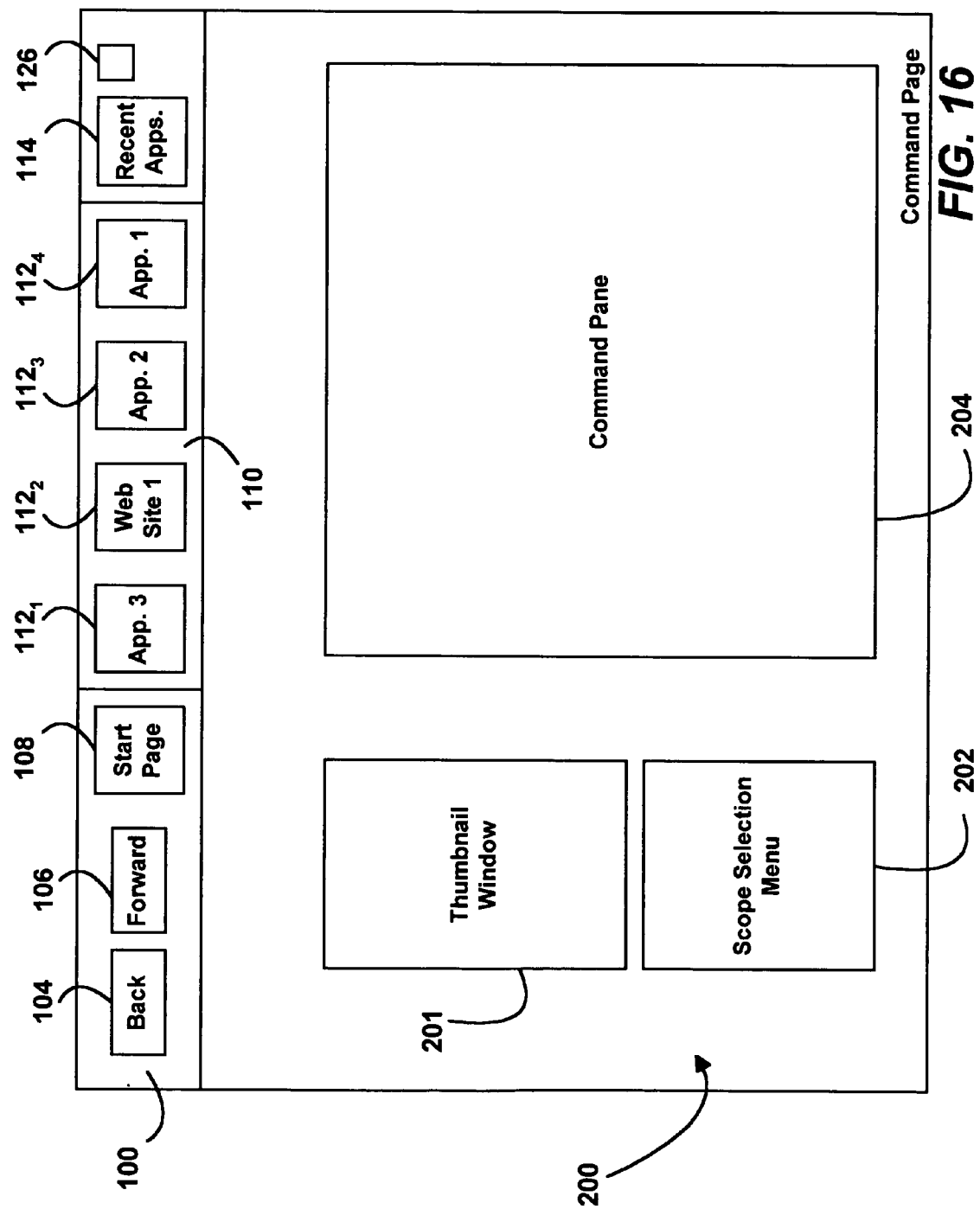
FIG. 16 a representation of an alternate embodiment of a rendered command page.

When applying the visual style templates, in one implementation, the assembly component attempts to display the largest fields 186 possible on the command page 190. For a context that provides a minimal number of commands 192, the "long name" 197 of all commands 192 may fit on the command page 190, along with the verbose information 198 (FIG. 15). If desired, icons 199 may be bubbled up according to a heuristic (e.g., user history, described further below). If a more extensive list is to be displayed, the command groups may be represented as pull menus or pop-up menus, with the commands nested therein, or icons for the commands may be presented.

The icons, short titles, and long titles may effect operation of the underlying command, or may represent a link. These links are simply pointers to another node on the command graph. By clicking on such a link, the system navigates to another command page that is created as described above.

A user may initiate construction of a command page in a number of ways. For example, a text-based search query may result in creation of a command page 190. In addition, a link to a command page or pages that is relevant to a particular context may be provided via a user interface (e.g., in the navigation bar 100). In accordance with one embodiment, right clicking (e.g., via the pointing device 42) on a particular location in a page instance 80 generates a command page scoped to the context of the page, and the applicability of the selection by the pointing device 42.

For example, if a user selects and right-clicks on text in a document in a word processing program, a list of pertinent commands related to the selected text are offered on the command page. For example, commands in font style command groups and justification command groups may be displayed. Because the font style commands are more pertinent to the selection of the text, the font style command group may be expanded into Font, Size, Style commands, and the like, and the verbose description may be displayed for those commands. The justification commands may not be as important for the selection (i.e., text), and therefore the justification command group may be presented only as link (e.g., via an icon) to a second command page. On the other hand, if the user selects and right clicks on a paragraph, the justification commands may expand and the font commands, which are still important, may also be expanded. However, a thesaurus link may be removed, since such a link applies to individual words, not an entire paragraph.

In accordance with another embodiment, right clicking on a general area of a document shown by an application page navigates the user to a command page 200, where a thumbnail of the document is displayed in a thumbnail window 201. A scope selection menu 202 is located just below the thumbnail window 201. The scope selection window 202 includes a number of different items that may be selected on the page in the thumbnail window 200 (e.g., cursor selection, word selection, paragraph selection, page selection, and document selection).

In response to a user selecting a scope selection in the scope selection window 202, the assembly component 188 creates a command and/or command group display in a command pane 204. If the user selects another scope selection, the assembly component points to a different node on the command node tree 192, and creates another display of commands and/or command groups in accordance with the node selection.

Selecting the back button 104 while at the command page 190 and before a commit has been made to a command's operation may result in "undo", "escape", "save", "OK", "enter", or may have no effect on the command page. A designer may define the result or backward navigation in accordance with a desired outcome. Preferably, if a command page is defined as a place by an application, navigating back to a command page does not result in an "undo" of a committed command operation.

Although the assembly component 188 has been described with reference to assembling a command page 190, the assembly component may instead create a command window or dialog box to be presented in conjunction with an application page or other page displayed by the shell user interface 62. The command window is preferably sized so that it minimizes view interference of the page instance 80 being hosted by the shell user interface 62. In addition, the assembly component 188 may present a toolbar having relevant icons for a selection and/or context.

Operation of the Present Invention

Figure 17:
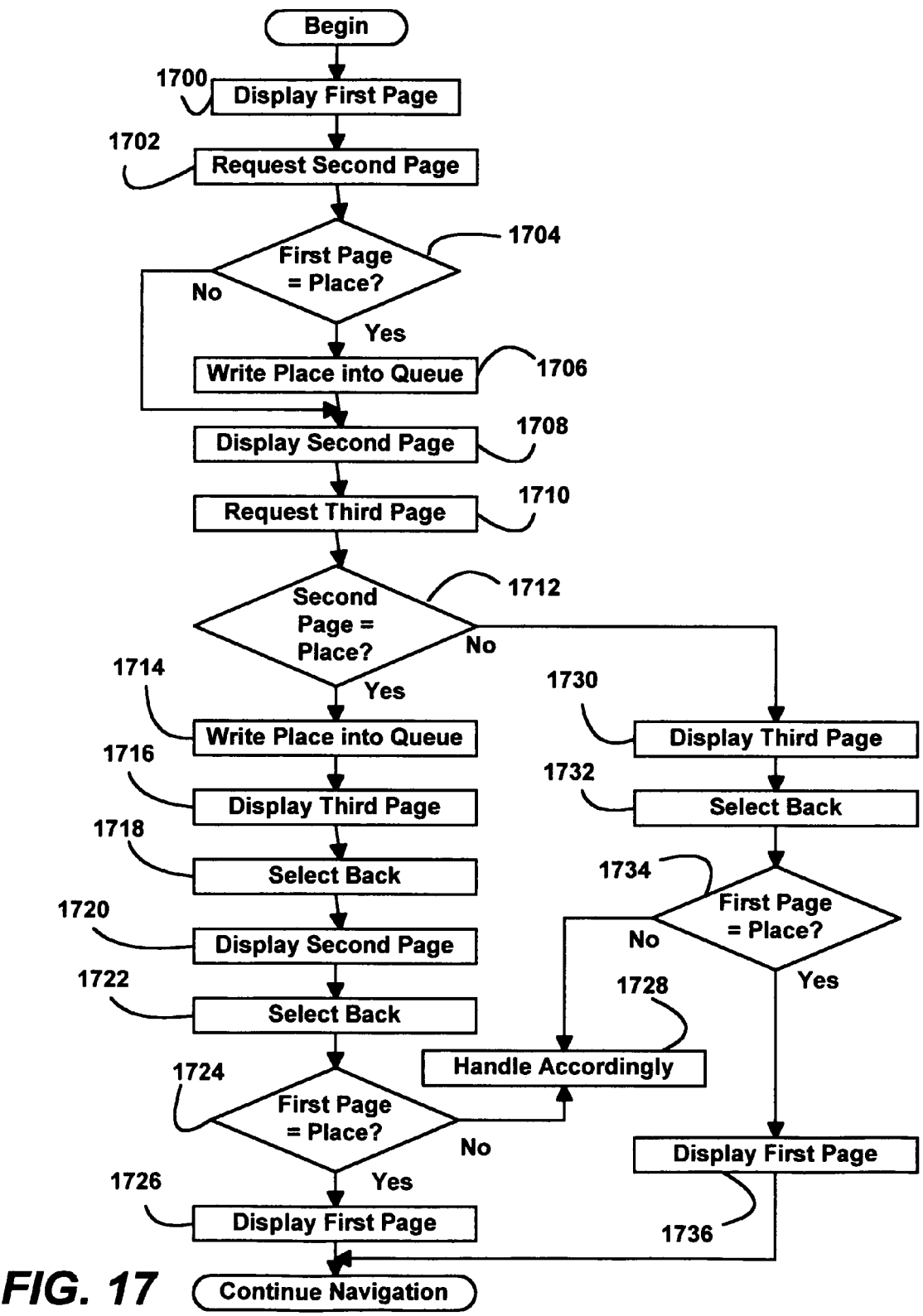
FIG. 17 is a flow diagram generally representing steps for navigating via a shell user interface in accordance with one aspect of the present invention.

Turning now to an explanation of the operation of the present invention, FIG. 17 shows a general overview of a process for navigating via the shell user interface 62 in accordance with one aspect of the present invention. Beginning at step 1700, a first page is displayed by the shell user interface 62. A user requests a second page at step 1702 (e.g., by selecting a link to the second page). If the first page is a place, then step 1704 branches to step 1706, where the place, or information about the place, is written into the global queue 81 and/or the appropriate application queue 82. The second page is then displayed at step 1708.

At step 1710, the user requests a third page via the shell user interface 62. If the second page is a place, then step 1712 branches to step 1714, where information about the second place is written into the global queue 81 and/or the respective application queue 82. The third page is then displayed at step 1716.

The user selects the back button 104 at step 1718. Since the second page is a place (step 1712), the shell component 64 accesses the travel log 81, which directs the shell component 64 to display the second page 1720 (described below with reference to FIG. 18). At step 1722, the back button 104 is selected again, and the first page, if it is a place (step 1724), is displayed by the shell user interface 62 (step 1726). If, however, the first page is not a place, then step 1704 skips to 1708, and information about the first page is not written into the queue. In addition, when the back button 104 is selected at step 1722, the user interface 62 does not navigate backward to the first page, but instead either advances to a previous place, or is handled appropriately in another manner (e.g., does not respond or indicates that there are no previous places).

Returning to step 1712, if the second page was not a place, then step 1712 branches to step 1730 where the third page is displayed. The user then selects the back button at step 1732. If the first page is a place, step 1734 branches to step 1736 where the first page is displayed. If, however, the first page is not a place, then step 1734 branches to step 1728, where the selection is handled appropriately.

The navigation sequence shown in FIG. 17 is a simplified navigation example. Navigation may continue beyond the sequence shown (e.g., by selecting the forward button 106 from either the first page or the second page), and may involve more complicated navigation steps as is described above.

Figure 18:
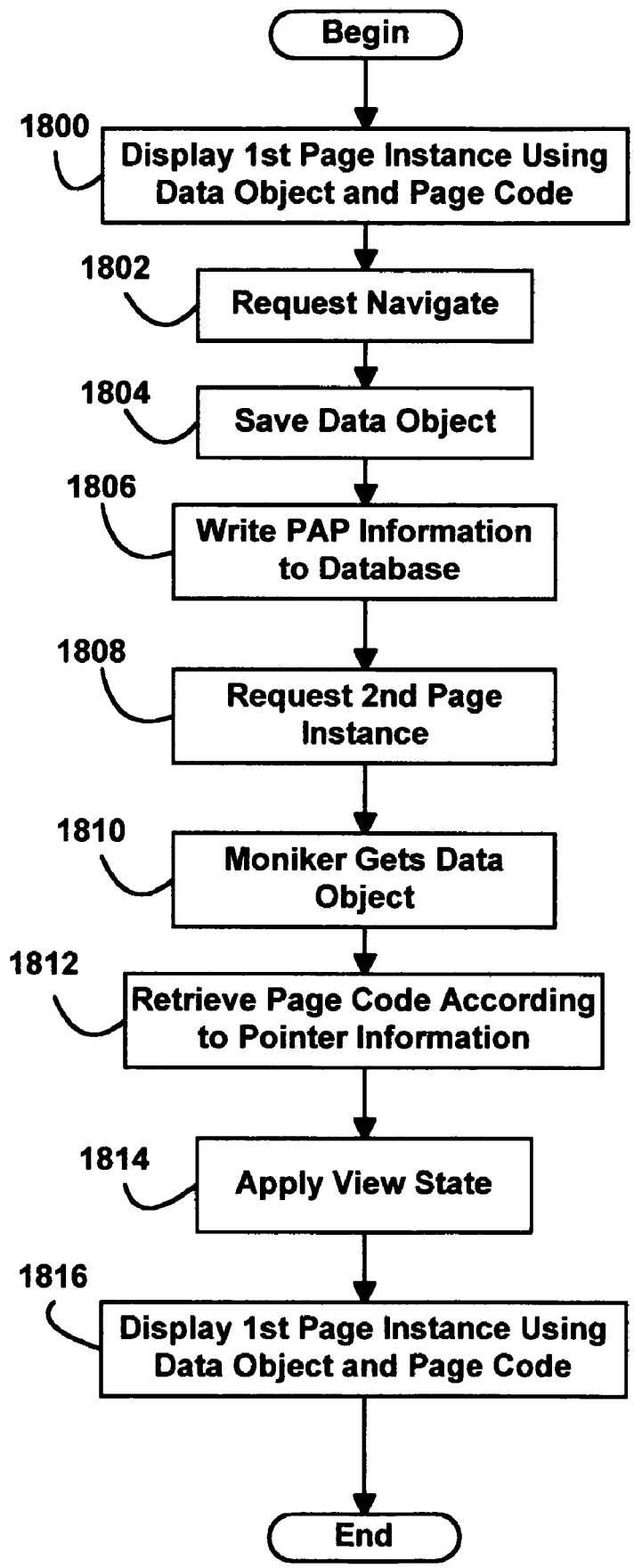
FIG. 18 is a flow diagram generally representing steps for reinstantiating a page instance in accordance with one aspect of the present invention.

FIG. 18 shows a general process for reinstantiating a page instance 80 in accordance with one aspect of the present invention. Beginning at step 1800, a first page instance is displayed by the shell user interface 62. At step 1802, a request is made by the user to navigate away from the first page (e.g., by selecting an application link 112 for another application). At 1804, the data object 76 for the page instance is saved via implicit save. Information about the page instance's Persistent Application Page 92 is then saved (e.g., written into the application queue 82 for the application) at step 1806.

After a navigation sequence, the user eventually requests that the page instance be displayed again at step 1808 (e.g., the user returns to the item via navigation with the back and forward buttons 104, 106.

To retrieve a second page instance 80 as a result of a request via the shell user interface 62 (e.g., by selecting the "back" button), at step 1810 the Persistent Application Page 92 is called and, in return, the moniker 96 retrieves the associated running data object 76. At step 1812, the page code 74 is retrieved according to the pointer information. The running data object 76 and the page code 74 are then combined to display the second page instance 80 in accordance with view information dictated by the view selector 95 (steps 1814 and 1816).

Figure 19:
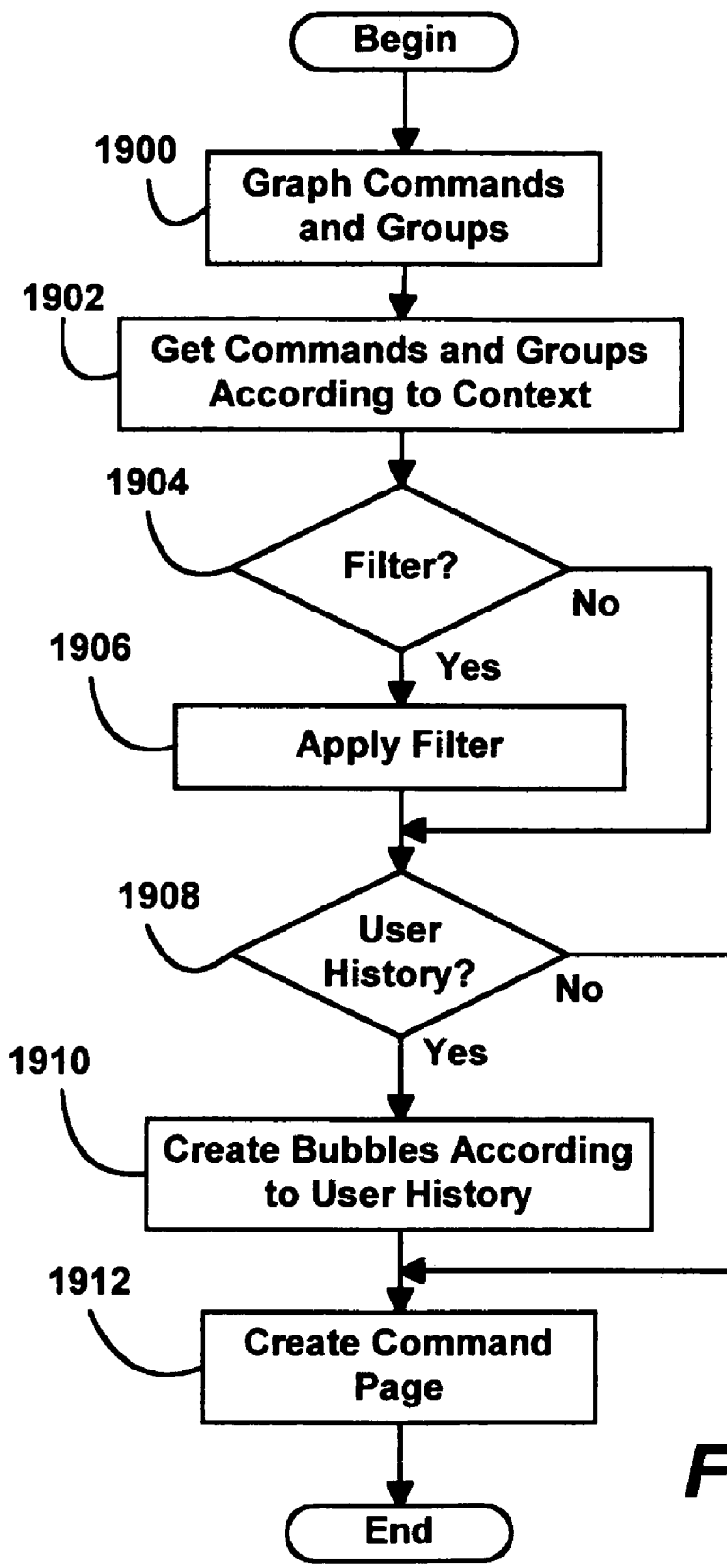
FIG. 19 is a flow diagram generally representing steps for creating a command page in accordance with one aspect of the present invention.

FIG. 19 shows a representation of a method for creating command pages in accordance with one aspect of the present invention. Beginning at step 1900, commands and command groups are grouped according to the command schema. The assembly mechanism 188 then, according to a particular context, begins generation of a command page by walking the commands graph from a node on the graph that is relevant to the particular context step of the application. If a filter is available, then step 1904 branches to step 1906, where the filter is applied. If not, then step 1904 skips to step 1908. If user history is available, step 1908 branches to step 1910, where the user history may be used to bubble particular commands or command groups to prominent locations on a command page. If user history is not available or not enabled, then step 1908 branches to step 1912, where the command page is created using the commands, command groups, the filter, and/or the user history.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system having a graphical user interface and a user interface selection device, a method of providing the user interface for selection therefrom, comprising:

automatically maintaining a sequence of places visited with the computer system by a user, the sequence including places visited by a plurality of different applications, where the sequence is maintained by automatically adding the places to the sequence when the user visits the places, where the maintaining is performed such that multiple places visited using a same application can exist in the sequence, and where the places in the sequence are ordered according to the order in which they are visited;

while displaying a first place corresponding to a first application of the plurality of applications, providing a first selection mechanism associated with the automatically maintained sequence of places visited on the computer system by the user; and in response to a user-input selection via the first selection mechanism, navigating from the first place corresponding to the first application to a second place corresponding to a second application of the plurality of different applications, wherein the first application and the second application are adjacent applications in the sequence, and wherein different types of documents visited by a same application are added to the sequence of places, and wherein types of places that can be added, if visited, also includes different user-activatable commands of the application and different documents opened by the application.

2. The method of claim 1, wherein navigating to a place comprises navigating to a previous place in the sequence.

3. The method of claim 2, wherein the first selection mechanism comprises a back button.

4. The method of claim 2, further comprising: displaying, along with the display of the first application, a second selection mechanism associated with the sequence of places according to the sequence, the selection of which navigates to the next place in the sequence of places.

5. The method of claim 4, wherein the second selection mechanism comprises a forward button.

6. The method of claim 5, wherein the first selection mechanism comprises a back button.

7. The method of claim 1, further comprising:

displaying, along with the display of the first application, a second selection mechanism; and in response to a signal indicative of a selection of the second selection mechanism, displaying a representation of the sequence of places.

8. The method of claim 7, wherein displaying the representation comprises displaying a recent places page comprising, for each of the places, a place link associated with the place.

9. The method of claim 8, further comprising:

in response to a signal indicative of a selection of one of the place links, navigating to the place associated with the one place link.

10. The method of claim 1, further comprising:

maintaining information about applications that have been displayed on the computer system; and displaying for each of the applications, according to the information about applications, a representation of the application.

11. The method of claim 10, further comprising:

in response to a signal indicative of a selection of one of the representations, taking action with respect to the application associated with the representation.

12. The method of claim 10, wherein each of the representations for each of the applications comprises a representation of a place most recently visited by the application.

13. The method of claim 12, further comprising:

in response to a signal indicative of a selection of a representation of a most recently visited place, displaying the most recently visited place in the respective application.

14. The method of claim 10, further comprising:

in response to a signal indicative of a first selection of one of the representations, displaying the application associated with the representation; and in response to a signal indicative of a second selection of one of the representations, displaying places that have been displayed in the application.

15. The method of claim 14, wherein the second selection comprises providing a menu that displays places that have been displayed in the application.

16. The method of claim 14, wherein the second selection comprises displaying a recent places page that displays the places that have been displayed in the application.

17. The method of claim 1, further comprising:

maintaining information about each of the places, the information including a reference to page code used to implement the place.

18. The method of claim 17, wherein the information about each of the places includes a reference to data that is combined with the page code to display the place.

19. The method of claim 18, wherein the information about each of the places includes view state information for the place.

20. A computer-readable medium having computer-executable instructions for performing the method recited in claim 1.

21. The method of claim 1, wherein the second application includes display information associated therewith, and further comprising overriding the display information so as to display the place in the second application in accordance with drawing functions provided by the user interface.

22. The method of claim 21, wherein the overriding comprises suppressing the display information.

23. The method of claim 21, wherein the overriding comprises rerouting the display information to the drawing functions of the shell component.

24. The method of claim 1, wherein the first application is displayed in a first application window, and wherein navigating to the second place corresponding to the second application comprises displaying the second place in a second application window that is not the same as the first application window.

25. The method of claim 1 further comprising:

displaying, as part of a display of a first application, a first link associated with the sequence of places according to the sequence; and in response to a signal indicative of a selection of the first link, displaying a recent places page including a representation of the sequence of places.

26. The method of claim 25, wherein displaying the representation of the sequence comprises for each of the places, a place link associated with the place.

27. The method of claim 26, further comprising:
in response to a signal indicative of a selection of one of the place links, navigating to the place associated with the one place link.

28. A computer-readable medium having computer-executable instructions for performing the method recited in claim 25.

29. The method of claim 1 wherein the step of automatically maintaining sequences of places visited includes automatically maintaining sequences of places visited for respective different applications configured to run on the computer system, where the sequences are maintained by, for each application, when a user visits a place with the application, automatically adding the to the application's sequence, where the maintaining is performed such that multiple places visited using a same application can exist in the sequence, and where the places in each sequence are ordered according to the order in which they are visited and wherein displaying a first place includes, simultaneously displaying, for each of the applications, a representation corresponding to the application, such that the representation is displayed as part of at least one of the applications, and wherein in response to a signal indicative of a selection of one of the representations, displaying the sequence of places that have been visited by the application.

30. The method of claim 29, wherein each of the representations for each of the applications comprises a representation of a place most recently visited by the application.

31. The method of claim 30, further comprising:
in response to a signal indicative of a selection of a representation of a most recently visited place, displaying the most recently visited place in the respective application.

32. The method of claim 29, wherein the displaying places that have been visited by the application comprises opening a menu that displays places that have been displayed in the application.

33. The method of claim 29, wherein the displaying places that have been visited by the application comprises displaying a recent places page that displays the places that have been displayed in the application.

34. The method of claim 29, wherein the representations of the applications are displayed on a selection bar.

35. The method of claim 29, wherein the representations of the applications are displayed on a recent applications page.

36. A computer-readable medium having computer-executable instructions for performing the method recited in claim 29.

37. The method of claim 1 wherein the step of automatically maintaining a sequence of places includes automatically maintaining a sequence of places visited by a user in order of visitation, and, for each place visited, maintaining place information including:
a reference to first executable code for displaying the place; and a reference to a data object that is bound with the executable code to display the place;
altering the data object in a second executable code so as to form an altered data object; and
in response to a request for the place, binding the altered data object and the first executable code and displaying an altered place.

38. The method of claim 37, wherein the place information includes view state information, and wherein the altered place is displayed according to the view state information.

39. The method of claim 37, wherein the altered data object includes view state information, and wherein the altered place is displayed according to the view state information.

40. The method of claim 37, wherein the altered place is displayed according to a view state registry.

41. The method of claim 37, wherein the reference to the first executable code comprises a pointer to the first executable code.

42. The method of claim 37, wherein the reference to the data object comprises a moniker.

43. A computer-readable medium having computer-executable instructions for performing the method recited in claim 37.

44. A computer system according to claim 1, wherein the providing comprises displaying a navigation control for navigating forward and backward through the sequence.

45. The method of claim 1 wherein the step of automatically maintaining a sequence of places includes automatically generating a chronological sequence of places visited by a user, where the places visited are visited using a plurality of applications on the computing device, and where places visited include commands of the applications invoked by the user, documents on the computing device accessed via the applications, and web links accessed by the user and wherein displaying a first place includes displaying a discrete graphical control that includes user-selectable representations of the places visited in an order corresponding to the order in which the places were visited, where selection of a representation by the user causes the representation's place visited to be activated by the computing device.

* * * * *